(12) United States Patent
Blaustein et al.

(10) Patent No.: US 12,516,131 B2
(45) Date of Patent: Jan. 6, 2026

(54) METHODS FOR PREVENTING ACUTE KIDNEY INJURY

(71) Applicant: University of Maryland, Baltimore, Baltimore, MD (US)

(72) Inventors: Mordecai P. Blaustein, Lutherville, MD (US); John Hamlyn, Columbia, MD (US); Stephen Gottlieb, Baltimore, MD (US); Ling Chen, Ellicott City, MD (US)

(73) Assignee: UNIVERSITY OF MARYLAND, BALTIMORE, Baltimore, MD (US)

(*) Notice: Subject to any disclaimer, the term of this patent is extended or adjusted under 35 U.S.C. 154(b) by 1158 days.

(21) Appl. No.: 17/112,206

(22) Filed: Dec. 4, 2020

(65) Prior Publication Data
US 2021/0085639 A1    Mar. 25, 2021

Related U.S. Application Data

(63) Continuation-in-part of application No. PCT/US2019/035402, filed on Jun. 4, 2019.

(60) Provisional application No. 62/680,209, filed on Jun. 4, 2018.

(51) Int. Cl.
| | |
|---|---|
| *C07K 16/44* | (2006.01) |
| *A61K 31/7048* | (2006.01) |
| *A61K 39/00* | (2006.01) |
| *A61K 39/395* | (2006.01) |
| *G01N 33/68* | (2006.01) |

(52) U.S. Cl.
CPC .......... *C07K 16/44* (2013.01); *A61K 31/7048* (2013.01); *A61K 39/00* (2013.01); *A61K 39/395* (2013.01); *G01N 33/6893* (2013.01); *A61K 2039/505* (2013.01); *G01N 2800/347* (2013.01)

(58) Field of Classification Search
None
See application file for complete search history.

(56) References Cited

U.S. PATENT DOCUMENTS

| | | |
|---|---|---|
| 6,699,676 B1 | 3/2004 | Orlov |
| 2017/0210793 A1 | 7/2017 | Weimbs |

FOREIGN PATENT DOCUMENTS

| | | |
|---|---|---|
| WO | 2004011028 A1 | 2/2004 |
| WO | 2012066141 A1 | 5/2012 |
| WO | 2019236590 A1 | 12/2019 |

OTHER PUBLICATIONS

Pelletier et al (ICTM, Chapter 16, pp. 251-348, 2020).*
Dasgupta et al (LS, 63(9):781-288, 1998).*
Mula-Abed et al (OMJ, 27(2):108-113, 2012).*
Extended European Search Report from Appl. No. EP21212369.9, mailed on May 11, 2022.
Khawaja et al., The utility of neutrophil gelatinase-associated Lipocalin (NGAL) as a marker of acute kidney injury (AKI) in critically ill patients, Biomarker Research, (2019), 7:1, XP055916424.
Dent et al., Plasma neutrophil gelatinase-associated lipocalin predicts acute kidney injury, morbidity and mortality after pediatric cardiac surgery: a prospective uncontrolled cohort study, Critical Care, (2007), 11:6. p. R127, XP021041371.
Villa et al., Ouabain Contributes to Kidney Damage in a Rat Model of Renal Ischemia-Reperfusion Injury, International Journal of Molecular Sciences, (2016), 17, p. 1728, XP055916135.
Bignami et al., Preoperative Endogenous Ouabain Predicts Acute Kidney Injury in Cardiac Surgery Patients, Critical Care Medicine, (2013), 41:744-755.
Supplementary European Search Report from Appl. No. EP19815233, mailed on Feb. 25, 2022.
Moore et al., Management of Acute Kidney Injury: Core Curriculum 2018, American Journal of Kidney Diseases, 72:136-148.
Venugopal et al., Ouabain Enhances ADPKD Cell Apoptosis via the Intrinsic Pathway, Frontiers in Physiology, 7: XP055889567.
Behringer et al., Percutaneous cardiopulmonary bypass for therapy resistant cardiac arrest form digoxin overdose, Resuscitation, (1998), 37:47-50.
Alobaidi et al., Sepsis-Associated Acute Kidney Injury, Semin Nephrol, (2015), 35:2-11.
O'Neal et al., Acute kidney injury following cardiac surgery: current understanding and future directions, Critical Care, (2016), 20:1-9.
Nguyen et al., Ouabain Binds with High Affinity to the Na,K-ATPase in Human Polycystic Kidney Cells and Induces Extracellular Signal-Regulated Kinase Activation and Cell Proliferation, J Am Soc Nephrol, (2007), 18:46-57.
Simonini et al., Endogenous Ouabain: An Old Cardiotonic Steroid as a New Biomarker of Heart Failure and a Predictor of Mortality after Cardiac Surgery, BioMed Research International, (2015), 2015:1-10.
International Search Report from Appl. No. PCT/US2019/035402, mailed on Aug. 28, 2019.

\* cited by examiner

*Primary Examiner* — Brad Duffy
(74) *Attorney, Agent, or Firm* — Nevrivy Patent Law Group P.L.L.C.

(57) ABSTRACT

The present invention provides a method of preventing, reducing or attenuating acute kidney injury in a subject at risk of experiencing a transient increase in kidney ischemia or hypoxia, comprising administering to the subject an effective amount of an agent that binds to and neutralizes endogenous ouabain (EO).

16 Claims, 10 Drawing Sheets

A.

B.

METHODS FOR PREVENTING ACUTE KIDNEY INJURY

CROSS-REFERENCE TO RELATED APPLICATIONS

This application is a Continuation-in-Part of International Appl. No.: PCT/US2019/035402, filed Jun. 4, 2019, which claims the benefit of U.S. Provisional Appl. No. 62/680,209 filed on Jun. 4, 2018. The contents of the aforementioned applications are hereby incorporated by reference in their entireties.

FIELD OF THE INVENTION

The field of the invention relates generally to the field of medicine and pharmaceuticals, and in particular to compositions and methods for preventing acute kidney injury induced by surgery.

BACKGROUND OF THE INVENTION

Acute kidney injury (AKI; Mehta et al., *Crit Care*, 11:R31, 2007; Srisawat et al., *Blood Purif*, 29:300-317, 2010) occurs in up to 30% of patients undergoing coronary artery bypass grafting (CABG) surgery or other major surgeries, and often requires dialysis (O'Neal et al., *Crit Care*, 20:187, 2016; Sear, *Br J Anesth*; Thiele et al., *Clin J Am Soc Nephrol*, 10:500-514, 2015). Mortality is high, particularly in the patients with pre-operative elevated plasma creatinine and plasma endogenous ouabain (EO) levels (Bignami et al., *Crit Care Med*, 41:744-756, 2013). As on the order of 2,000 CABG surgeries are carried out worldwide per day, this problem produces a significant unmet need for a solution.

Endogenous ouabain (EO), an adrenocortical hormone, is the natural ligand for the high affinity cardiotonic steroid binding site on sodium ($Na^+$) pumps, proteins present in all cells in humans and mammals (Dostanic-Larson et al., *Proc Natl Acad Sci*, 102:15845-15850, 2011; Huang et al., *Hypertension* 34:733-738, 1999; Lingrel, *Ann Rev Physiol* 72:395-412, 2010; Sandtner et al., *J Biol Chem* 286:38177-38183, 2011). Plasma EO is elevated in nearly half of all humans with essential hypertension, in most patients with hypertension due to aldosterone-producing adenomas (Rossi et al., *J Hypertens* 13:1181-1191, 1995; Pierdomenico et al., *Am J Hypertens* 14:44-50, 2001), and in a number of rodent hypertension models (Blaustein et al., *Am J Physiol Heart Circ Physiol* 302:H1031-H1049, 2012; Huang et al., *Hypertension* 34:733-738, 1999; Pulina et al., *Adv Exp Med Biol* 961:365-374, 2013). EO also is elevated in patients with heart failure where it is inversely related to cardiac index (Gottlieb et al., *Circulation* 86:420-425, 1992), and in a large fraction of patients undergoing CABG surgery where it has been linked to acute kidney injury (AKI) (Bignami et al., *Crit Care Med*, 41:744-756, 2013; Simonini et al., *Nephrol Dial Transplant* 29:1696-1701, 2014; Simonini et al. *BioMed Res Int* 2015:714793, 2015).

Previous studies have indicated that the significant correlation of plasma EO concentration with cardiac index (inverse relationship; (Gottlieb et al., *Circulation* 86:420-425, 1992) and mean arterial pressure (direct correlation; Rossi et al., *J Hypertens* 13:1181-1191, 1995; Pierdomenico et al., *Am J Hypertens* 14:44-50, 2001), imply that EO may be an important homeostatic factor in humans. Previous publications have shown that preoperative plasma EO levels are powerful biomarkers of AKI and postoperative complications and may be a direct cause of podocyte damage in the kidney (Bignami et al., *Crit Care Med*, 41:744-756, 2013). Preclinical studies performed on rats have shown that a small molecule ouabain receptor antagonist (that is not approved for clinical use) attenuates ischemia-induced kidney injury (Ferrandi et al., *J Pharmacol Exp Therap* 351: 278-287, 2014; Villa et al., *Int J Mol Sci* 17:E1728, 2016). Moreover, clinical studies conducted at the University of Maryland, Baltimore, at the University Vita Salute San Rafaelle, Milan, Italy, and at Brigham & Womens Hospital, Harvard University, Boston, have shown that the CABG surgery patients with the highest plasma EO levels tend to have the poorest clinical outcomes (Bignami et al., *Crit Care Med*, 41:744-756, 2013; Simonini et al., *Nephrol Dial Transplant* 29:1696-1701, 2014). A study from 2013 demonstrated that the ambient circulating EO value in the days prior to CABG surgery was the strongest predictor of acute kidney injury (Bignami et al., *Crit Care Med*, 41:744-756, 2013).

The cause of the AKI that often follows CABG surgery is not known. One contemporary hypothesis is that the AKI is a result of the transient kidney (renal) ischemia that may occur during the surgery. Indeed, a rodent model of renal ischemia (renal artery clamping) and reperfusion is often used to induce AKI. Furthermore, AKI also often develops following other major surgeries such as laparotomies (especially with only a temporary abdominal closure), thoracotomies and orthopaedic surgeries (Kelz et al., *Ann Surg* 258:359-363, 2013; Kim et al., *Anesth Analg* 119:1121-1132, 2014; Loftus et al., *Shock* 48:5-10, 2017; Long et al., *Anesth Analg* 122:1912-1920, 2016; McCreath et al., *Ann Thoracic Surg* 75:812-819, 2003; Sear, *Br J Anesth* 95:20-32, 2005; Weingarten et al., *Obes Surg* 23:64-70, 2013). In these surgical patients, too, AKI has been postulated to occur as a result of transient peri-operative renal ischemia (Romagnoli & Ricci, *Minerva Anesthesiol* 81:684-696, 2015; Sear, *Br J Anesth*; Thiele et al., *Clin J Am Soc Nephrol*, 10:500-514, 2015). In addition, AKI can be triggered by contrast agents independent of major surgery. The phenomenon of post contrast-induced AKI has been linked with medullary ischemia secondary to profound and long lasting intrarenal vasoconstriction (Ozkok and Ozkok, *World Journal of Nephrol* 6(3):86-99, 2017). Older patients (e.g., over age 65), obese patients, patients with high pre-operative plasma EO levels, diabetic patients and those with modestly elevated plasma creatinine levels are all at high risk for post-op development of AKI (Bignami et al., *Crit Care Med*, 41:744-756, 2013; Simonini et al., *Nephrol Dial Transplant* 29:1696-1701, 2014).

The mechanism by which EO contributes to AKI is not known. However, EO is a stress hormone (i.e., its plasma level is elevated by major stress) (Bignami et al., *Crit Care Med*, 41:744-756, 2013; Cavalcante-Silva et al., *Front Physiol* 8:895, 2017; Simonini et al., *Nephrol Dial Transplant* 29:1696-1701, 2014). Ouabain triggers oxidative stress and the generation of reactive oxygen species (ROS) that can lead to cell death (apoptosis), e.g., in the brain (Souza et al., *Behav Brain Res* 271:316-324, 2014; Valvassori et al, *J Psychiatr Res* 65:63-70, 2015; Yan et al., *Mol Cell Biochem* 398:95-104, 2015). ROS is involved in ouabain-activated Na pump-mediated signaling transduction (e.g., in a cultured kidney cell line; Yan et al., *J Biol Chem* 288:34249-34258, 2013). Since ROS contribute to post-ischemic renal injury (El Sabbahy & Vaidya, *Wiley Interdiscip Rev Syst Biol Med* 3:606-618, 2011). the elevated plasma EO may aggravate any renal injury/ischemia that occurs during surgery.

EO also plays a physiological role. For example, plasma EO is elevated in pregnant rodents (Jacobs et al., *Am J Physiol Heart Circ Physiol* 302:H1317-H1329, 2012). Indeed, in pregnant mice with mutant, ouabain-resistant receptors (the α2 isoform of the Na+ pump catalytic subunit), systolic blood pressure (BP) was significantly lower than normal (by ≈9 mm Hg, or ≈8%) during the third trimester of pregnancy (Oshiro et al., *Am J Hypertens* 23:1279-1285, 2010). Even though EO helps to sustain normal BP in pregnant mice, the animals do not go into shock when EO cannot bind to its receptor. Apparently only a small fraction of the BP in the normal state depends upon EO.

At present, there is no effective therapy for the treatment of AKI. There is clearly an unmet need to identify therapeutic agents/treatments that can be used to treat and especially to prevent AKI in patients undergoing surgery, and in particular surgery that involves the heart such as CABG surgery.

It is known that antibodies with high preferential selectivity for digoxin have varying, and often high, affinities for ouabain as well as other closely related steroids that may be endogenous to mammals including bufalin and marinobufagenin (Ishkaraeva-Yakovleva et al, *Reprod Sci.* 19(12): 1260-1267, 2012. Pullen et al. *J Pharmacol Ext Ther.* 310:319-325, 2004). These antibodies have been developed for the treatment of digoxin toxicity and related conditions by processing into the form of isolated 'Fragment antigen binding' regions, referred to as Fab or F(ab')2 fragments. Particularly known are three proprietary Fabs known as DIGIFAB, DIGIBIND and DIGIDOT. Anti-digoxin Fab fragments can reverse the non-toxic and toxic effects of digoxin-Na$^+$ pump interactions by binding to and (immuno-) neutralizing digoxin, thereby lowering the ambient free digoxin concentration (Nabauer & Erdmann, Klin Wochenschr. 65:558-561, 1987; Cano et al., *Toxicol Lett*, 86:107-111, 1996). The fragments can reactivate Na$^+$ pumps that are inhibited by digoxin, and ouabain, as well as endogenous cardiotonic steroids (Balzan et al, *Quart J Nucl Med.* 39(2): 134-139, 1995. Kent et al, *Brain Research.* 1018:171-180, 2004. Ishkaraeva-Yakovleva et al, *Reprod Sci.* 19(12):1260-1267).

The anti-digoxin Fab fragment preparation (DIGIBIND) approved for treating digitalis toxicity has been postulated to improve maternal and fetal outcomes in patients with severe preeclampsia (Lam et al., *Am J Obstet Gynecol* 209: 19e1-6, 2013). However, the mechanisms underlying maternal and fetal pathologies in preeclampsia are unknown. At this time a clinical trial of DIGIFAB for use in treating preeclampsia is listed in clinicaltrials.gov but the efficacy thereof is unknown.

CABG surgery-induced AKI is a different condition/disease and there is no evidence that links the AKI in preeclampsia to that following CABG. It is unknown whether simply lowering free plasma EO can affect the outcome in susceptible patients, much as it has been found that removing β-amyloid associated with Alzheimer's disease does not necessarily provide a treatment for that condition.

DIGIFAB, (BTG International Inc) is a sterile, purified, lyophilized preparation of digoxin-immune ovine Fab (monovalent) immunoglobulin fragments. DIGIFAB has an affinity for digoxin in the range of $10^9$ to $10^{10} M^{-1}$. When administered to a patient, DIGIFAB binds to the molecules of digoxin reducing the free digoxin levels which results in a shift in the equilibrium away from the binding to the receptors thereby reducing the cardio-toxic effects of digoxin. DIGIFAB is indicated for the treatment of patients with life-threatening or potentially life-threatening digoxin toxicity or overdose.

There is a need to develop new methods and compositions for preventing acute kidney injury in patients undergoing cardiopulmonary bypass (CPB) surgery such as coronary artery bypass graft (CABG) surgery or other major surgeries. The present invention satisfies this need and provides additional advantages as well.

This background information is provided for informational purposes only. No admission is necessarily intended, nor should it be construed, that any of the preceding information constitutes prior art against the present invention.

SUMMARY OF THE INVENTION

It is to be understood that both the foregoing general description of the embodiments and the following detailed description are exemplary, and thus do not restrict the scope of the embodiments.

In one aspect, the present invention relates to methods and compositions for preventing acute kidney injury (AKI), particularly in patients undergoing surgical procedures that may cause a patient to have transient kidney ischemia and injury, such as coronary artery bypass graft (CABG) surgery. The method utilizes ouabain binding antibodies and fragments thereof, including those raised to be anti-digoxin antibodies and fragments, administered to patients prior to, during and after surgery.

In another aspect, the invention provides a method of preventing, reducing or attenuating acute kidney injury in a subject at risk of experiencing a transient increase in kidney ischemia or hypoxia, comprising administering to the subject an effective amount of an agent that binds to and neutralizes endogenous ouabain (EO).

In another aspect, the invention provides a method for assaying acute kidney injury in a subject at risk of experiencing a transient increase in kidney ischemia or hypoxia, comprising
  i) administering to the subject an effective amount of an agent that binds to and neutralizes endogenous ouabain (EO);
  ii) obtaining a blood sample from the subject at one or more time points;
  iii) assaying the blood sample to measure a quantity of neutrophil gelatinase-associated lipocalin in the sample; and
  iv) comparing the quantity of neutrophil gelatinase-associated lipocalin measured to a control.

In another aspect, the invention provides a method for preventing, reducing or attenuating acute kidney injury in a subject undergoing surgery comprising administering to said subject at least one treating dose of ouabain binding antibody fragments prior to that surgery. In some embodiments, the treating dose of fragment is sufficient to reduce the level of endogenous free ouabain in the patient. In some embodiments, the dose is sufficient to remove at least about 90% of circulating free ouabain from the subjects' plasma. In some embodiments, the ouabain binding antibody fragment is a Fab or F(ab)2 antibody. In some embodiments, the fragment is of an antibody raised against digoxin or an immunogenically active digoxin derivative. In some embodiments, the digoxin derivative is digoxindicarboxymethoxylamine (DDMA). In some embodiments, the antibody is raised against ouabain or an ouabain derivative.

In some embodiments, the fragments are of antibodies raised in sheep or horses, more preferably being fragments of ovine antibodies raised in sheep. In some embodiments, the fragments are as provided in DIGIFAB, DIGIBIND or DIGIDOT.

In some embodiments, the dose of ouabain binding antibody fragments is administered about 6 to about 36 hours before surgery. In some embodiments, the dose is administered about 12 to about 24 hours before surgery.

In some embodiments, the ouabain binding antibody fragments are administered a second time immediately prior to surgery. In some embodiments, the second time is within about an hour of surgery.

In some embodiments, the ouabain binding antibody fragments are administered a third time within about 6 to about 36 hours after surgery. In some embodiments, the third time is within about 24 hours after surgery.

In some embodiments, the fragment dose administered for each administration is preferably from about 20 mg to about 160 mg with respect to Fab fragments, that being about 40 mg to about 320 mg for the two administration regimen and about 60 mg to about 480 mg for the three administration regimen. For DIGIFAB, this is preferably about 40 mg to about 120 mg for each administration.

In some embodiments, the ouabain binding antibody fragment is in the form of DIGIFAB, and the dose is from about 40 mg to about 120 mg each administration.

In some embodiments, the surgery is cardiopulomonary bypass (CABG) surgery. In some embodiments, the subject is a high-risk patient with reduced renal glomerular filtration rate. In some embodiments, the subject undergoing surgery is a high-risk patient with diabetes. In some embodiments, the subject is a patient with a kidney glomerular filtration rate (GFR) of <60 ml/min. In some embodiments, the subject has abnormal creatinine clearance and proteinuria. In some embodiments, the subject has an high endogenous ouabain level. In some embodiments, the subject has an endogenous ouabain level of from 133 to about 500 pM, or more.

In some embodiments, the dose of ouabain binding antibody fragment is sufficient to attenuate or prevent the post-op decline of renal function measured as an increase of 1.5-fold or ≥0.3 mg/dL in plasma creatinine.

In some embodiments, the dose of ouabain binding antibody fragment is sufficient to attenuate or prevent the post-op decline of renal function measured as a decline of >50% in GFR.

In another aspect, the invention provides an ouabain binding antibody fragment preparation for the prevention, reduction or attenuation of acute kidney injury in surgery.

In another aspect, the invention provides a composition comprising ouabain binding antibody fragments for the prevention, reduction or attenuation of acute kidney injury in surgery.

In another aspect, the invention provides for the use of ouabain binding antibody fragments for the manufacture of a medicament for the prevention, reduction or attenuation of acute kidney injury in surgery.

In another aspect, the invention provides a method of preventing, reducing or attenuating acute kidney injury in a subject undergoing surgery, comprising administering to the subject an effective amount of an agent that binds to endogenous ouabain. In some embodiments, the agent inhibits the binding of endogenous ouabain to a $Na^+/K^+$-ATPase ($Na^+$ pump). In some embodiments, the agent is an antibody. In some embodiments, the antibody comprises a Fab, Fab' or F(ab')2 fragments. In some embodiments, the antibody is selected from DIGIFAB, DIGIBIND, DIGIDOT and combinations thereof.

In another aspect, the invention relates to a method for preventing acute kidney injury in a subject undergoing surgery comprising administering to said subject at least one treating dose of DIGIFAB about 12 to about 24 hours before surgery and wherein the dose is about 20 mg to about 80 mg.

In another aspect, the invention relates to a method for preventing acute kidney injury in a subject undergoing surgery comprising administering to said subject one treating dose of DIGIFAB about 12 to about 24 hours before surgery wherein the dose is about 20 to 80 mg and a second treating dose of about 20 mg to about 80 mg immediately before surgery.

In another aspect, the invention relates to a method for preventing acute kidney injury in a subject undergoing a cardiopulomonary bypass (CPB) surgery comprising administering to said subject at least one treating dose of DIGIFAB about 12 to about 24 hours before surgery wherein the treating dose is about 3.5 mg/Kg body weight.

In another aspect, the invention relates to a method for treating acute kidney injury in a subject which has undergone CABG surgery comprising administering to said subject at least one treating dose of DIGIFAB and wherein the treating dose is about 3.5 mg/Kg body weight.

In another aspect, the invention relates to a method for preventing acute kidney injury in a subject undergoing CABG surgery comprising administering to said subject a treating dose of DIGIFAB wherein the treating dose is sufficient to remove at least about 90% of circulating Ouabain from subject's plasma.

In another aspect, the invention relates to a method for preventing acute kidney injury in a subject undergoing CABG surgery comprising administering to said subject a treating dose of DIGIFAB wherein the treating dose is sufficient to remove at least about 95% of circulating Ouabain from subject's plasma. In another aspect, the invention relates to a method for preventing acute kidney injury in a subject undergoing CABG surgery comprising administering to said subject a treating dose of DIGIFAB wherein the treating dose is sufficient to remove at least about 98% of circulating Ouabain from subject's plasma.

In another aspect, the invention relates to a method for preventing acute kidney injury in a subject undergoing CABG surgery comprising administering to said subject a treating dose of DIGIFAB wherein the treating dose is sufficient to remove at least about 99% of circulating Ouabain from subject's plasma.

In another aspect, the invention relates to a method for attenuating or preventing renal injury in a subject undergoing CABG surgery comprising administering to said subject a treating dose of DIGIFAB about 12 to 24 hours before the surgery and wherein the dose is about 20 mg to 80 mg and a second treating dose of about 20 to 80 mg immediately before surgery.

In another aspect, the invention relates to a method for attenuating or preventing renal injury in a subject undergoing CABG surgery comprising administering to said subject at least one treating dose of DIGIFAB wherein the treating dose is about 3.5 mg/Kg body weight.

In another aspect, the invention relates to a method for attenuating or preventing renal failure in a subject undergoing CABG surgery comprising administering to said subject a treating dose of DIGIFAB which is sufficient to neutralize at least about 95% of circulating ouabain in said subject's plasma. Ouabain plasma levels in the patient can be determined using routine assay methods for determination of ouabain values/concentrations.

In another aspect, the invention provides a method of screening for agents that prevent, reduce or attenuate acute kidney injury during surgery, comprising
  i) combining a suspected ouabain binding agent and one or more of ouabain, digoxin or a derivative thereof;
  ii) detecting binding of the suspected ouabain binding agent and ouabain, digoxin or a derivative thereof;
  iii) administering the suspected ouabain binding agent to a subject undergoing surgery; and
  iv) assaying kidney function in the subject.

In another aspect, the invention provides a method of screening for a suspected ouabain binding agent that prevents, reduces or attenuates acute kidney injury in a subject, comprising
  i) administering an effective amount of the suspected ouabain binding agent to a subject;
  ii) subjecting the subject to a condition that results in renal ischemia or hypoxia for a period of time;
  iii) obtaining a blood sample from the subject at one or more time points;
  iv) assaying the blood sample to measure a quantity of neutrophil gelatinase-associated lipocalin in the sample; and
  v) comparing the quantity of neutrophil gelatinase-associated lipocalin measured to a control.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE FIGURES

The skilled artisan will understand that the drawings, described below, are for illustration purposes only. The drawings are not intended to limit the scope of the present teachings in any way.

DETAILED DESCRIPTION OF THE INVENTION

Figure 1:
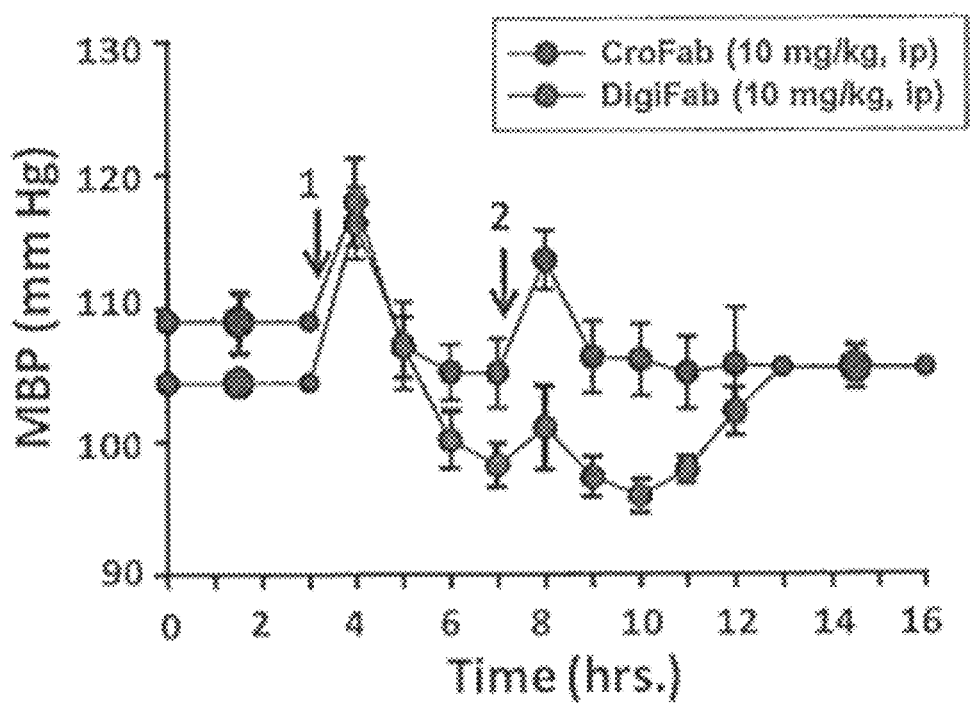
FIG. 1. DIGIFAB, but not CroFab, lowers mean arterial blood pressure (MBP) in rats on LS diet. A. Rats were fed 0.04% NaCl (LS)×16 days, then given two 10 mg/kg ip doses (at '1' and '2') of DIGIFAB one day and CroFab (Fab control) the next, or vice-versa. n=6 rats. DIGIFAB=P<0.001 vs CroFab & Baseline (ANOVA). B. Bar graph of data from panel A. Rats were fed 0.04% NaCl (LS)×16 days, then given two 10 mg/kg ip doses (4 hrs apart) of DIGIFAB one day and CroFab (Fab 'control') the next, or vice-versa. DIGIFAB/CroFab data are from hrs 6, 7, 9-11 in panel A. ***=P<0.001; n=6 rats; ANOVA.
Figure 1:
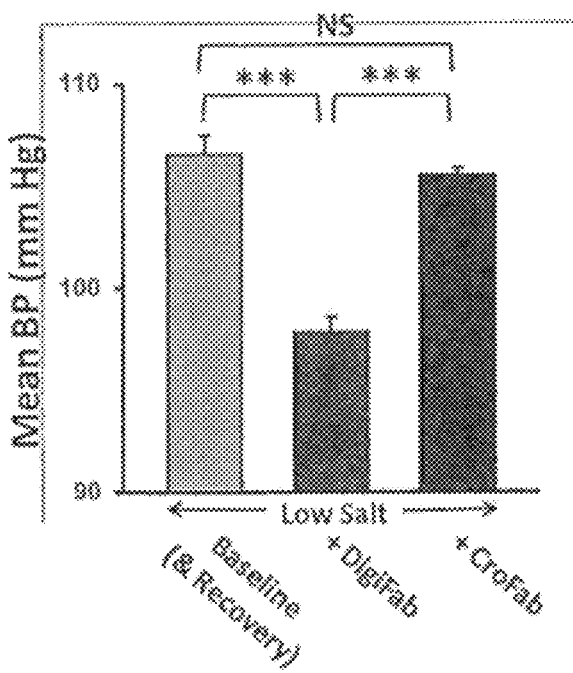

The invention herein described provides use of ouabain binding agents such as antibody fragments having specificity for ouabain as a novel and effective therapy for preventing acute kidney injury in surgical procedures, particularly in cardiopulmonary bypass procedures. More particularly these antibody fragments have utility in reducing risk of CABG patients requiring kidney dialysis or kidney transplant.

The present inventors have determined that such Fab preparations, and their $Fab_2$ counterparts, may be given at feasible doses and yet have clinical effectiveness in reducing or preventing acute kidney injury in surgery, particularly surgery such as CABG.

The present inventors have discovered that ouabain associated injury (as reflected by creatinine levels) can be ameliorated with ouabain binding antibody fragments, particularly by DIGIFAB, and the treated subjects return to normal levels in an acceptable timeframe. Together with experiments that show that such DIGIFAB administration does not adversely affect blood pressure from the normal, this has provided them with confirmation that clinical use will address this previously unmet need.

Reference will now be made in detail to the presently preferred embodiments of the invention which, together with the drawings and the following examples, serve to explain the principles of the invention. These embodiments describe in sufficient detail to enable those skilled in the art to practice the invention, and it is understood that other embodiments may be utilized, and that structural, biological, and chemical changes may be made without departing from the spirit and scope of the present invention. Unless defined otherwise, all technical and scientific terms used herein have the same meanings as commonly understood by one of ordinary skill in the art.

The practice of the present invention employs, unless otherwise indicated, conventional techniques of molecular biology (including recombinant techniques), microbiology, cell biology, biochemistry and therapeutics, which are within the skill of the art. Such techniques are explained fully in the literature. See, e.g., Sambrook et al. *Molecular Cloning: A Laboratory Manual*, $2^{nd}$ edition (1989); *Current Protocols in Molecular Biology* (F. M. Ausubel et al. eds. (1987)); the series *Methods in Enzymology* (Academic Press, Inc.); *PCR: A Practical Approach* (M. MacPherson et al. IRL Press at Oxford University Press (1991)); *PCR 2: A Practical Approach* (M. J. MacPherson, B. D. Hames and G. R. Taylor eds. (1995)); *Antibodies, A Laboratory Manual* (Harlow and Lane eds. (1988)); *Using Antibodies, A Laboratory Manual* (Harlow and Lane eds. (1999)); and *Animal Cell Culture* (R. I. Freshney ed. (1987)).

Unless defined otherwise, all technical and scientific terms used herein have the same meaning as commonly understood by those of ordinary skill in the art to which this invention pertains. The following references provide one of skill with a general definition of many of the terms used in this invention: *Academic Press Dictionary of Science and Technology*, Morris (Ed.), Academic Press ($1^{st}$ ed., 1992); *Oxford Dictionary of Biochemistry and Molecular Biology*, Smith et al. (Eds.), Oxford University Press (revised ed., 2000); *Encyclopaedic Dictionary of Chemistry*, Kumar (Ed.), Anmol Publications Pvt. Ltd. (2002); *Dictionary of Microbiology and Molecular Biology*, Singleton et al. (Eds.), John Wiley & Sons (3rd ed., 2002); *Dictionary of Chemistry*, Hunt (Ed.), Routledge ($1^{st}$ ed., 1999); *Dictionary of Pharmaceutical Medicine*, Nahler (Ed.), Springer-Verlag Telos (1994); *Dictionary of Organic Chemistry*, Kumar and Anandand (Eds.), Anmol Publications Pvt. Ltd. (2002); and *A Dictionary of Biology* (*Oxford Paperback Reference*), Martin and Hine (Eds.), Oxford University Press ($4^{th}$ ed., 2000). Further clarifications of some of these terms as they apply specifically to this invention are provided herein.

For the purpose of interpreting this specification, the following definitions will apply and whenever appropriate, terms used in the singular will also include the plural and vice versa. In the event that any definition set forth below conflicts with the usage of that word in any other document, including any document incorporated herein by reference, the definition set forth below shall always control for purposes of interpreting this specification and its associated claims unless a contrary meaning is clearly intended (for example in the document where the term is originally used). The use of "or" means "and/or" unless stated otherwise. As used in the specification and claims, the singular form "a," "an" and "the" include plural references unless the context clearly dictates otherwise. For example, the term "a cell" includes a plurality of cells, including mixtures thereof. The use of "comprise," "comprises," "comprising," "include," "includes," and "including" are interchangeable and not intended to be limiting. Furthermore, where the description of one or more embodiments uses the term "comprising," those skilled in the art would understand that, in some specific instances, the embodiment or embodiments can be alternatively described using the language "consisting essentially of" and/or "consisting of."

As used herein, the term "about" means plus or minus 10% of the numerical value of the number with which it is being used.

In one embodiment, the invention provides a method of preventing, reducing or attenuating acute kidney injury in a subject at risk of experiencing a transient increase in kidney ischemia or hypoxia, comprising administering to the subject an effective amount of an agent that binds to and neutralizes endogenous ouabain (EO).

In one embodiment, the invention provides a method of preventing, reducing or attenuating acute kidney injury (AKI) in a subject undergoing surgery, comprising administering to the subject an effective amount of an agent that binds to endogenous ouabain.

In another embodiment, the invention relates to a method for preventing, reducing or attenuating acute kidney injury in a subject undergoing surgery comprising administering to said subject at least one treating dose, and more preferably two treating doses of ouabain binding antibody fragments prior to that surgery. In some embodiments, the treating dose of fragment should be sufficient to reduce the level of endogenous free ouabain in the subject.

In another embodiment, the invention provides a method for assaying acute kidney injury in a subject at risk of experiencing a transient increase in kidney ischemia or hypoxia, comprising
  i) administering to the subject an effective amount of an agent that binds to and neutralizes endogenous ouabain (EO);
  ii) obtaining a blood sample from the subject at one or more time points;
  iii) assaying the blood sample to measure a quantity of neutrophil gelatinase-associated lipocalin in the sample; and
  iv) comparing the quantity of neutrophil gelatinase-associated lipocalin measured to a control.

The term "subject" as used herein is not limiting and is used interchangeably with patient. In some embodiments, the subject refers to animals, such as mammals. For example, mammals contemplated include humans, primates, dogs, cats, sheep, cattle, goats, pigs, horses, chickens, mice, rats, rabbits, guinea pigs, and the like.

As used herein, "treat" and all its forms and tenses (including, for example, treating, treated, and treatment) can refer to therapeutic or prophylactic treatment. In certain aspects of the invention, treating encompasses preventing, reducing or attenuating acute kidney injury in a subject undergoing surgery. Those in need thereof of treatment include those subjects undergoing surgery or who are at risk of a transient increase in kidney ischemia or hypoxia in which case treating refers to administering to a subject (including, for example, a human or other mammal in need of treatment) a therapeutically effective amount of a composition so that acute kidney injury is prevented, reduced or attenuated in the subject. The prevention, reduction or attenuation may be any observable or measurable prevention, reduction or attenuation. Thus, one of skill in the art realizes that a treatment may improve the patient's condition, but may not be a complete cure or prevention of the pathological condition.

In accordance with the invention, a "therapeutically effective amount" or "effective amount" is administered to the subject. As used herein a "therapeutically effective amount" or "effective amount" is an amount sufficient to prevent, reduce or attenuate acute kidney injury in a subject.

In some embodiments the subject to be treated is at risk of experiencing a transient increase in kidney ischemia or hypoxia. This can be caused by a surgical procedure in some embodiments. In some embodiments, this can be caused by sepsis. The surgical procedure is not necessarily limiting. In some embodiments, the subject is undergoing a procedure that that may cause a patient to have transient kidney ischemia and injury, such as cardiopulmonary bypass surgery (CPB). In some embodiments the CPB is a coronary artery bypass graft (CABG) surgery. In some embodiments, the surgery is cardiopulmonary bypass surgery (CPB), a coronary artery bypass graft (CABG), laparotomy, thoracotomy, orthopaedic or bariatric surgery or other major surgery. In yet other procedures, renal ischemia may result from the use of contrast agents.

Acute kidney injury can normally be assessed by assaying an increase in serum creatinine levels. Normal human serum creatinine levels are generally regarded to be from 0.6-1.3 mg/deciliter in humans (according to the Mayo Clinic). Stage 1 (mild) acute kidney injury is normally defined as an increase in serum creatinine of ≥0.3 mg/dL or a 1.5-fold increase above baseline. See, e.g., Mehta et al., Crit Care 11(2): R31, 2007; Srisawat et al., Blood Purification 29: 300-307, 2010.

In some embodiments, the subject is at high risk for acute kidney injury and can include older patients (e.g., over age 65), obese patients, diabetic patients, patients with high pre-operative plasma endogenous ouabain levels, patients with reduced creatinine clearance and those with modestly elevated plasma creatinine levels. Endogenous ouabain is a stress hormone (i.e., its plasma level is elevated following major stress), and this may aggravate any renal injury/ischemia that occurs as the result of surgery and/or use of contrast agents.

In some embodiments, the subject is a high-risk patient with reduced renal glomerular filtration rate. In some embodiments, the subject undergoing surgery is a high-risk patient with diabetes.

In some embodiments, the subject is a patient with an increase in serum creatinine of ≥0.3 mg/dL or a 1.5-fold increase above baseline.

In some embodiments, the subject is a patient with a kidney glomerular filtration rate (GFR) of <60 ml/min. In some embodiments, the subject has abnormal creatinine clearance and proteinuria.

In some embodiments, the subject has an abnormally high endogenous ouabain level. The normal endogenous ouabain level in patients is typically about <133 pM. In some embodiments, patients at high risk for acute kidney injury have endogenous ouabain levels of from 133 pM to about 500 pM or more.

Extracellular fluid volume in a normal 70 kg man is about 20% of body weight, or about 14 liters. Thus, in some embodiments, a maximal amount of endogenous ouabain that would need neutralization can be estimated at about 0.5 nM×14 liters=7 nmoles of endogenous ouabain. For example, one vial of DIGIFAB (40 mg) should bind approximately 640 nmoles of digoxin, but only about 96 nmoles of ouabain. Thus two doses of one vial of DIGIFAB (one dose 15-18 hrs and one dose 1 hr before surgery) should be sufficient. In some embodiments, for a more conservative treatment, 2-4 vials could be employed for each dose, with a maximum of 8 vials per dose in unusual cases.

The subject can receive one or more administrations of an effective amount of an agent that binds to endogenous ouabain prior to, during, and/or shortly after the surgical procedure.

In some embodiments, the agent is administered within about two hours prior to surgery to about 36 hours before surgery. In some embodiments, the agent is administered within about two hours prior to surgery to about 24 hours before surgery. In some embodiments, the agent is administered within about two hours prior to surgery to about 12 hours before surgery. In some embodiments, the agent is administered within about two hours prior to surgery to about 8 hours before surgery. In some embodiments, the agent is administered about 6 hours before surgery to about 36 hours before surgery. In some embodiments, the agent is administered about 10 to about 30 hours before surgery. In some embodiments, the agent is administered about 12 to about 24 hours before surgery.

In some embodiments, the agent is administered a second time before surgery. In some embodiments, the second administration is immediately prior to surgery. In some embodiments, the second time is within about an 1-2 hours of surgery.

In some embodiments, the ouabain binding antibody fragments are administered a third time within about 6 to about 36 hours after surgery. In some embodiments, the third time is within about 24 hours after surgery.

In accordance with the methods described herein, the subject is administered an agent that binds to ouabain. In some embodiments, the dose of the ouabain binding agent is sufficient to reduce the level of endogenous free ouabain in the subject. In some embodiments, the dose is sufficient to remove at least about 30%, at least about 40%, at least about 50%, at least about 60%, at least about 70%, at least about 80%, at least about 90%, or at least about 95% of circulating endogenous free ouabain in the subject's plasma.

Ouabain is known to bind to a $Na^+/K^+$ ATPase. See, e.g., Sandtner et al., *J Biol Chem.* 2011 Nov. 4; 286(44): 38177-38183. The $Na^+/K^+$ ATPase is an integral membrane protein that is almost ubiquitous throughout the animal kingdom. In some embodiments, the ouabain binding agent inhibits binding of ouabain to a $Na^+/K^+$ ATPase.

The binding agent is not limiting and can include, for example, a small molecule (e.g., <1000 Da), nucleic acid, peptide, polypeptide or antibody. Binding agents can be identified by various methods, including library screening, phage display, antibody generation, and antibody screening. In one embodiment, the binding agent is an antibody or antibody mixture.

The term "antibody" means an immunoglobulin molecule that recognizes and binds to a target through at least one antigen recognition site within the variable region of the immunoglobulin molecule. As used herein, the term "antibody" encompasses intact polyclonal antibodies, intact monoclonal antibodies, antibody fragments (such as Fab, Fab', F(ab')2, and Fv fragments, dual affinity retargeting antibodies (DART)), single chain Fv (scFv) mutants, multispecific antibodies such as bispecific and trispecific antibodies generated from at least two intact antibodies, chimeric antibodies, humanized antibodies, human antibodies, fusion proteins comprising an antigen determination portion of an antibody, and any other modified immunoglobulin molecule comprising an antigen recognition site so long as the antibodies exhibit the desired biological activity.

In some embodiments, an antibody can be of any the five major classes of immunoglobulins: IgA, IgD, IgE, IgG, and IgM, or subclasses (isotypes) thereof (e.g. IgG1, IgG2, IgG3, IgG4, IgA1 and IgA2), based on the identity of their heavy-chain constant domains referred to as alpha, delta, epsilon, gamma, and mu, respectively. The different classes of immunoglobulins have different and well known subunit structures and three-dimensional configurations. Antibodies can be naked or conjugated to other molecules such as toxins, radioisotopes, etc.

The basic four-chain antibody unit is a heterotetrameric glycoprotein composed of two identical light (L) chains and two identical heavy (H) chains. Each H chain has at the N-terminus, a variable region ($V_H$) followed by three constant domains ($C_H$) for each of the $\alpha$ and $\gamma$ chains and four $C_H$ domains for and $\varepsilon$ isotypes. Each L chain has at the N-terminus, a variable region ($V_L$) followed by a constant domain ($C_L$) at its other end. The $V_L$ is aligned with the $V_H$ and the $C_L$ is aligned with the first constant domain of the heavy chain ($C_H1$). Particular amino acid residues are believed to form an interface between the light chain and heavy chain variable regions. The pairing of a $V_H$ and $V_L$ together forms a single antigen-binding site. For the structure and properties of the different classes of antibodies, see, e.g., Basic and Clinical Immunology, 8th edition, Daniel P. Stites, Abba I. Terr and Tristram G. Parslow (eds.), Appleton & Lange, Norwalk, Conn., 1994, page 71, and Chapter 6.

The L chain from any vertebrate species can be assigned to one of two clearly distinct types, called kappa ($\kappa$) and lambda ($\lambda$), based on the amino acid sequences of their constant domains ($C_L$). Depending on the amino acid sequence of the constant domain of their heavy chains ($C_H$), immunoglobulins can be assigned to different classes or isotypes. There are five classes of immunoglobulins: IgA, IgD, IgE, IgG, and IgM, having heavy chains designated alpha ($\alpha$), delta ($\delta$), epsilon ($\varepsilon$), gamma ($\gamma$) and mu ($\mu$) respectively. The $\gamma$ and $\alpha$ classes are further divided into subclasses on the basis of relatively minor differences in $C_H$ sequence and function, e.g., humans express the following subclasses: IgG1, IgG2, IgG3, IgG4, IgA1, and IgA2.

The term "ouabain binding fragment" or antibody fragment refers to a portion of an intact antibody and comprises the antigenic determining variable regions of an intact antibody. Examples of antigen binding fragment include, but are not limited to Fab, Fab', F(ab')2, and Fv fragments, linear antibodies, single chain antibodies, and multispecific antibodies formed from antibody fragments.

A "monoclonal antibody" refers to a homogeneous antibody population involved in the highly specific recognition and binding of a single antigenic determinant, or epitope. This is in contrast to polyclonal antibodies that typically include different antibodies directed against different antigenic determinants. The term "monoclonal antibody" encompasses both intact and full-length monoclonal antibodies as well as antibody fragments (such as Fab, Fab', F(ab')2, Fv), single chain (scFv) mutants, fusion proteins comprising an antibody portion, and any other modified immunoglobulin molecule comprising an antigen recognition site. Furthermore, "monoclonal antibody" refers to such antibodies made in any number of manners including but not limited to by hybridoma, phage selection, recombinant expression, and transgenic animals.

The term "humanized antibody" refers to forms of non-human (e.g. murine) antibodies that are specific immunoglobulin chains, chimeric immunoglobulins, or fragments thereof that contain minimal non-human (e.g., murine) sequences. Typically, humanized antibodies are human immunoglobulins in which residues from the complementary determining region (CDR) are replaced by residues from the CDR of a non-human species (e.g. mouse, rat, rabbit, hamster) that have the desired specificity, affinity, and capability (Jones et al., 1986, Nature, 321:522-525; Riechmann et al., 1988, Nature, 332:323-327; Verhoeyen et al., 1988, Science, 239:1534-1536). In some instances, the Fv framework region (FR) residues of a human immunoglobulin are replaced with the corresponding residues in an antibody from a non-human species that has the desired specificity, affinity, and capability. The humanized antibody can be further modified by the substitution of additional residues either in the Fv framework region and/or within the replaced non-human residues to refine and optimize antibody specificity, affinity, and/or capability. In general, the humanized antibody will comprise substantially all of at least one, and typically two or three, variable domains containing all or substantially all of the CDR regions that correspond to the non-human immunoglobulin whereas all or substantially all of the FR regions are those of a human immunoglobulin consensus sequence. The humanized antibody can also comprise at least a portion of an immunoglobulin constant region or domain (Fc), typically that of a human immunoglobulin. Examples of methods used to generate humanized antibodies are described in U.S. Pat. No. 5,225,539 or 5,639,641.

A "variable region" of an antibody refers to the variable region of the antibody light chain or the variable region of the antibody heavy chain, either alone or in combination. The variable regions of the heavy and light chain each consist of four framework regions (FR) connected by three complementarity determining regions (CDRs) also known as hypervariable regions. The CDRs in each chain are held together in close proximity by the FRs and, with the CDRs from the other chain, contribute to the formation of the antigen-binding site of antibodies. The term "hypervariable region" when used herein refers to the amino acid residues of an antibody that are responsible for antigen binding. The hypervariable region generally comprises amino acid residues from a "complementarity determining region" or "CDR" (e.g., around about residues 24-34 (L1), 50-56 (L2) and 89-97 (L3) in the $V_L$, and around about 31-35 (H1), 50-65 (H2) and 95-102 (H3) in the $V_H$ when numbered in accordance with the Kabat numbering system; Kabat et al., Sequences of Proteins of Immunological Interest, 5th Ed. Public Health Service, National Institutes of Health, Bethesda, Md. (1991)); and/or those residues from a "hypervariable loop" (e.g., residues 24-34 (L1), 50-56 (L2) and 89-97 (L3) in the $V_L$, and 26-32 (H1), 52-56 (H2) and 95-101 (H3) in the $V_H$ when numbered in accordance with the Chothia numbering system; Chothia and Lesk, *J. Mol. Biol.* 196:901-917 (1987)); and/or those residues from a "hypervariable loop"/CDR (e.g., residues 27-38 (L1), 56-65 (L2) and 105-120 (L3) in the $V_L$, and 27-38 (H1), 56-65 (H2) and 105-120 (H3) in the $V_H$ when numbered in accordance with the IMGT numbering system; Lefranc, M. P. et al. *Nucl. Acids Res.* 27:209-212 (1999), Ruiz, M. e al. *Nucl. Acids Res.* 28:219-221 (2000)).

The term "human antibody" means an antibody produced by a human or an antibody having an amino acid sequence corresponding to an antibody produced by a human made using any technique known in the art. This definition of a human antibody includes intact or full-length antibodies, fragments thereof, and/or antibodies comprising at least one human heavy and/or light chain polypeptide such as, for example, an antibody comprising murine light chain and human heavy chain polypeptides.

A "neutralizing antibody" inhibits one or more functions of endogenous ouabain in the subject. In some embodiments, the neutralizing antibody is capable of inhibiting binding of endogenous ouabain to a $N^+/K^+$-ATPase.

An "intact" antibody is one that comprises an antigen-binding site as well as a $C_L$ and at least heavy chain constant domains, $C_{H1}$, $C_{H2}$ and $C_{H3}$. The constant domains may be native sequence constant domains (e.g., human native sequence constant domains) or amino acid sequence variants thereof.

The term "chimeric antibodies" refers to antibodies wherein the amino acid sequence of the immunoglobulin molecule is derived from two or more species. Typically, the variable region of both light and heavy chains corresponds to the variable region of antibodies derived from one species of mammals (e.g. mouse, rat, rabbit, etc) with the desired specificity, affinity, and capability while the constant regions are homologous to the sequences in antibodies derived from another (usually human) to avoid eliciting an immune response in that species.

The antibodies that can be used herein also include antibodies in which a portion of the heavy and/or light chain is identical with or homologous to corresponding sequences in antibodies belonging to a particular antibody class or subclass, while the remainder of the chain(s) is identical with or homologous to corresponding sequences in antibodies derived from another species or belonging to another antibody class or subclass, as well as fragments of such antibodies.

In some embodiments, chimeric antibodies may comprise residues that are not found in the recipient antibody or in the donor antibody. In some embodiments, modifications are made to further refine antibody performance. For further details, see Jones et al., *Nature* 321:522-525 (1986); Riechmann et al., *Nature* 332:323-329 (1988); and Presta, *Curr. Op. Struct. Biol.* 2:593-596 (1992).

"Binding affinity" generally refers to the strength of the sum total of noncovalent interactions between a single binding site of a molecule (e.g., an antibody) and its binding partner (e.g., ouabain). Unless indicated otherwise, as used herein, "binding affinity" refers to intrinsic binding affinity which reflects a 1:1 interaction between members of a binding pair (e.g., antibody and ouabain). The affinity of a molecule X for its partner Y can generally be represented by the dissociation constant ($K_d$). Low-affinity antibodies generally bind antigen slowly and tend to dissociate readily, whereas high-affinity antibodies generally bind antigen faster and tend to remain bound longer.

The affinity or avidity of an antibody for ouabain can be determined experimentally using any suitable method well known in the art, e.g. flow cytometry, enzyme-linked immunoabsorbent assay (ELISA), or radioimmunoassay (RIA), or kinetics (e.g., BIACORE™ analysis). Direct binding assays as well as competitive binding assay formats can be readily employed. (See, for example, Berzofsky, et al., "Antibody-Antigen Interactions," In Fundamental Immunology, Paul, W. E., Ed., Raven Press: New York, N.Y. (1984); Kuby, Janis Immunology, W.H. Freeman and Company: New York, N.Y. (1992); and methods described herein. The measured affinity of a particular antibody-antigen interaction can vary if measured under different conditions (e.g., salt concentration, pH, temperature). Thus, measurements of affinity and other antigen-binding parameters (e.g., $K_D$ or $K_d$, $K_{on}$, $K_{off}$) are made with standardized solutions of antibody and antigen, and a standardized buffer, as known in the art and such as the buffer described herein.

In some embodiments, the method utilizes one or more ouabain binding antibodies and fragments thereof, including those raised to be anti-digoxin (or an immunogenically active digoxin derivative) antibodies and fragments, administered to patients prior to, during and/or after surgery. In some embodiments, the digoxin derivative is digoxindicarboxymethoxylamine (DDMA). Digoxin monoclonal antibodies are described in the literature. See, e.g., U.S. Pat. Nos. 4,606,855; 4,703,003; 6,255,458 and Ball et al., *The Journal of Immunology*, 1999, 163: 2291-2298, which are incorporated by reference herein. In some embodiments, the antibody is raised against endogenous ouabain or an ouabain derivative. Ouabain antibodies and methods of making ouabain antibodies are described in U.S. Pat. Nos. 7,348,412 and 5,844,091, for example, which are incorporated by reference herein.

An "ouabain binding antibody" means an antibody that reacts immunologically with or binds (selectively) or contains a binding domain for ouabain. Ouabain binding antibodies could include, without limitation, antibodies that bind to digoxin or derivatives thereof, ouabain or derivatives thereof, or to a conjugate of any one of the foregoing.

In some embodiments, the antibodies can be monoclonal, polyclonal, human, humanized or non-human antibodies.

In some embodiments, the antibody comprises fragments of antibodies, including polyclonal fragment mixtures. In some embodiments, the antibodies are raised in sheep or horses, more preferably being fragments of ovine antibodies raised in sheep. In some embodiments, the antibody comprises Fab, Fab' and/or F(ab')2 fragments.

In some embodiments, the antibody is an antibody raised against digoxin. In some embodiments, the antibody comprises one or more digoxin immune fab fragments. In some embodiments, the antibodies are Fab preparations of sheep polyclonal anti-digoxin antibodies. Such antibody preparations can be prepared using known methods by persons skilled in the art. For example, see U.S. Pat. Nos. 4,742,159 and 5,733,742 which are incorporated herein by reference.

Digoxin immune Fab (ovine), which was marketed in the United States as DIGIBIND by GlaxoSmithKline and DIGIFAB by BTG International Inc., is a sterile lyophilized powder of antigen binding fragments (FAB) derived from specific antidigoxin antibodies raised in sheep. DIGIDOT is another preparation of digoxin immune fab. Digoxin immune fab (ovine) is indicated for treatment of digoxin or digitoxin overdose manifested by severe ventricular arrhythmias such as ventricular tachycardia or ventricular fibrillation, or progressive bradyarrhythmias such as severe sinus bradycardia or second or third degree heart block not responsive to atropine. DIGIBIND is distributed in vials, with each vial containing 38 mg of digoxin-specific Fab fragments plus 75 mg of sorbitol as a stabilizer and 28 mg of sodium chloride and capable of binding approximately 0.5 mg of digoxin. DIGIBIND is generally administered by intravenous injection after reconstitution with 4 mL/vial of sterile water for injection. DIGIFAB is distributed in 40 mg vials and contains no preservatives. DIGIFAB is generally administered by intravenous infusion over at least thirty minutes after reconstitution with 4 mL/vial of sterile water for injection. DIGIFAB (and thus Digoxin immune Fab) can be made according to the process described by Thillaivinayagalingam et al., *J Chromatogr B Analyt Technol Biomed Life Sci.,* 848 (2007) 88-96; Ward et al., *Therapeutic Drug Monitoring,* 22:599-607, 2000; Pullen et al., *J Immunol Meth,* 336:235-241, 2008, which is incorporated herein by reference. DIGIBIND is described by Smith et al., *Biochemistry* 1970; 9:331-337; Curd J et al., *Proc Natl Acad Sci USA* 1971; 68:2401-2406; and Butler et al., *Proc Natl Acad Sci USA* 1967; 57:71-78, which are incorporated by reference herein.

DIGIFAB and DIGIBIND have comparable, relatively high affinity for ouabain, with DIGIBIND possibly having up to twice the capacity to bind ouabain or digoxin. See FIGS. 2 and 3. DIGIDOT has possibly up to 10 times less binding capacity. The relative amounts of each to completely bind 10 pM of ouabain in a human are estimated as approximately 30:1 DIGIFAB, 15:1 DIGIFAB and 200:1 DIGIDOT. Such dose would be far above the normal doses given for the approved indication of digoxin overdose. Nevertheless, the expected range of endogenous ouabain in humans is expected to be about 0.1 to 0.5 nM, which is 20,000- to 100,000-fold lower than 10 µM, thus surgical patients at risk for acute kidney injury could therefore be treated with much lower doses than those approved for treating digoxin overdose.

In some embodiments, the dose of the antibody administered at each administration is from about 20 mg to about 160 mg with respect to Fab fragments. In some embodiments, the total of the fragment doses administered is between about 40 mg to about 320 mg for a two administration regimen and between about 60 mg to about 480 mg for a three administration regimen.

In some embodiments, the ouabain binding antibody fragment is in the form of DIGIFAB (Digoxin immune Fab), and the dose is from about 2 mg to about 200 mg for each administration. In some embodiments, the dose is from about 40 mg to about 120 mg for each administration.

In some embodiments, the dose of ouabain binding agent, such as an antibody fragment is sufficient to attenuate or prevent the post-op decline of renal function measured as a decline of >50% in GFR.

In another embodiment, the invention relates to a method for preventing acute kidney injury in a subject undergoing CABG surgery comprising administering to said subject a treating dose of DIGIFAB (Digoxin immune Fab), wherein the treating dose is sufficient to remove at least about 90% of circulating ouabain from subjects' plasma, more preferably the dose is sufficient to remove at least about 95% of circulating ouabain from subjects' plasma, still more preferably removing at least about 98% or at least 99% of circulating ouabain from subject's plasma.

In another embodiment, the invention provides a method for preventing acute kidney injury in a subject undergoing surgery comprising administering to said subject at least one treating dose of DIGIFAB (Digoxin immune Fab) about 12 to 24 hours before surgery and wherein the dose is about 20 mg to about 80 mg.

In another embodiment, the invention provides a method for preventing acute kidney injury in a subject undergoing surgery comprising administering to said subject one treating dose of DIGIFAB (Digoxin immune Fab) about 12 to 24 hours before surgery wherein the dose is about 20 to 80 mg and a second treating dose of about 20 mg to about 80 mg immediately before surgery.

In another embodiment, the invention relates to a method for preventing, reducing or attenuating acute kidney injury in a subject undergoing surgery comprising administering to said subject one treating dose of DIGIFAB (Digoxin immune Fab) about 12 to about 24 hours before surgery wherein the dose is about 20 to about 80 mg and a second treating dose of about 20 mg to about 80 mg immediately before surgery.

In another embodiment, the invention relates to a method for preventing, reducing or attenuating acute kidney injury in a subject undergoing surgery such as CABG surgery comprising administering to said subject a treating dose of DIGIFAB (Digoxin immune Fab) about 12 to about 24 hours before the surgery and wherein the dose is about 20 mg to about 80 mg and a second treating dose of about 20 mg to about 80 mg immediately before surgery.

In another embodiment, the invention relates to a method for preventing, reducing or attenuating acute kidney injury in a subject undergoing surgery such as CABG surgery comprising administering to said subject at least one treating dose of DIGIFAB (Digoxin immune Fab) wherein the treating dose is about 2 mg/Kg body weight to about 5 mg/Kg body weight, more preferably about 3.5 mg/Kg body weight.

In another embodiment, the invention relates to a method for preventing, reducing or attenuating AKI in a subject undergoing surgery such as CABG surgery comprising administering to said subject a treating dose of DIGIFAB (Digoxin immune Fab) which is sufficient to neutralize at least about 95% of circulating free ouabain.

In another embodiment, the invention relates to a method for preventing acute kidney injury in a subject undergoing surgery, such as CABG surgery comprising administering to said subject at least one treating dose of DIGIFAB (Digoxin immune Fab) about 12 to about 24 hours before surgery wherein the treating dose is from about 2 to 5 mg/Kg, more preferably about 3.5 mg/Kg body weight.

In another embodiment, the invention relates to a method for treating acute kidney injury in a subject who has undergone surgery, such as CABG surgery comprising administering to said subject at least one treating dose of DIGIFAB (Digoxin immune Fab) and wherein the treating dose is about 2 mg/Kg body weight to about 5 mg/Kg body weight, more preferably 3.5 mg/Kg body weight.

In some embodiments, the subject is a high-risk patient with reduced renal glomerular filtration rate. Typically such patient will have a kidney glomerular filtration rate (GFR) of <60 ml/min, additionally they may have abnormal creatinine clearance and proteinuria.

In some embodiments, the subject is a high-risk patient having elevated endogenous ouabain levels. The incidence of severe acute kidney injury correlates directly with the pre-operative plasma ouabain level (e.g., Bignami et al., *Crit Care Med* 41: 744-755, 2013). As the normal endogenous ouabain level is typically <133 pM. In patients at high risk for AKI endogenous ouabain levels from 133 to about 500 pM or more are expected.

In a still more embodiments of the present invention, the dose of ouabain binding antibody fragment is sufficient to attenuate or prevent the post-op decline of renal function measured as a decline of >50% in GFR.

In another embodiment, the invention provides a method for preventing acute kidney injury in a subject undergoing a surgery such as cardiopulomonary bypass (CPB) or CABG surgery comprising administering to said subject at least one treating dose of DIGIFAB (Digoxin immune Fab) about 12 to 24 hours before surgery wherein the treating dose is about 3.5 mg/Kg body weight.

In another embodiment, the invention provides a method for treating acute kidney injury in a subject which has undergone surgery such as cardiopulmonary bypass (CPB) or CABG comprising administering to said subject at least one treating dose of DIGIFAB (Digoxin immune Fab) and wherein the treating dose is about 3.5 mg/Kg body weight.

In another embodiment, the invention provides a method for preventing acute kidney injury in a subject undergoing surgery such as cardiopulmonary bypass (CPB) or CABG surgery comprising administering to said subject a treating dose of DIGIFAB (Digoxin immune Fab) wherein the treating dose is sufficient to remove at least about 90% of circulating ouabain from subject's plasma.

In another embodiment, the invention provides a method for preventing acute kidney injury in a subject undergoing cardiopulmonary bypass (CPB) or CABG surgery comprising administering to said subject a treating dose of DIGIFAB (Digoxin immune Fab) wherein the treating dose is sufficient to remove at least about 95% of circulating ouabain from subject's plasma.

In another embodiment, the invention provides a method for preventing acute kidney injury in a subject undergoing cardiopulmonary bypass (CPB) or CABG surgery comprising administering to said subject a treating dose of DIGIFAB (Digoxin immune Fab) wherein the treating dose is sufficient to remove at least about 98% of circulating ouabain from subject's plasma.

In another embodiment, the invention provides a method for preventing acute kidney injury in a subject undergoing cardiopulmonary bypass (CPB) or CABG surgery comprising administering to said subject a treating dose of DIGIFAB (Digoxin immune Fab) wherein the treating dose is sufficient to remove at least about 99% of circulating ouabain from subject's plasma.

In another embodiment, the invention provides a method for attenuating or preventing renal injury in a subject undergoing cardiopulmonary bypass (CPB) or CABG surgery comprising administering to said subject a treating dose of DIGIFAB (Digoxin immune Fab) about 12 to 24 hours before the surgery and wherein the dose is about 20 to 80 mg and a second treating dose of about 20 mg to 80 mg immediately before surgery.

In another embodiment, the invention relates to a method for attenuating or preventing renal injury in a subject undergoing cardiopulmonary bypass (CPB) or CABG surgery comprising administering to said subject at least one treating dose of DIGIFAB (Digoxin immune Fab) wherein the treating dose is about 3.5 mg/Kg body weight.

In another embodiment, the invention relates to a method for attenuating or preventing renal failure in a subject undergoing cardiopulmonary bypass (CPB) or CABG surgery comprising administering to said subject a treating dose of DIGIFAB (Digoxin immune Fab) which is sufficient to neutralize at least about 95% of circulating Ouabain in said subject's plasma. Determination of ouabain plasma levels in the patient can be determined using routine assay methods for determination of ouabain values/concentrations.

Compositions

In another embodiment, the invention provides a composition for use in the methods of the invention comprising an ouabain binding agent as described herein In another embodiment, the invention provides for the use of an ouabain binding agent for the manufacture of a medicament for the prevention, reduction or attenuation of acute kidney injury in surgery.

In some embodiments, the ouabain binding agent is an antibody fragment preparation, for example, a Digoxin immune Fab composition such as DIGIFAB, DIGIBIND or DIGIDOT.

In some embodiments, the compositions comprise one or more antibodies of the invention. In certain embodiments, the compositions are pharmaceutical compositions. In some embodiments, formulations are prepared for storage and use by combining an antibody with a pharmaceutically acceptable vehicle (e.g. carrier, excipient) (*Remington, The Science and Practice of Pharmacy* 20th Edition Mack Publishing, 2000). In some embodiments, pharmaceutical compositions of the present invention are characterized as being at least sterile and pyrogen-free. As used herein, "pharmaceutical formulations" include formulations for human and veterinary use. Pharmaceutical compositions of the invention can be packaged for use in liquid form, or can be lyophilized.

Suitable pharmaceutically acceptable vehicles include, but are not limited to, nontoxic buffers such as phosphate, citrate, and other organic acids; salts such as sodium chloride; antioxidants including ascorbic acid and methionine; preservatives (e.g. octadecyldimethylbenzyl ammonium chloride; hexamethonium chloride; benzalkonium chloride; benzethonium chloride; phenol, butyl or benzyl alcohol; alkyl parabens, such as methyl or propyl paraben; catechol; resorcinol; cyclohexanol; 3-pentanol; and m-cresol); low molecular weight polypeptides (e.g. less than about 10 amino acid residues); proteins such as serum albumin, gelatin, or immunoglobulins; hydrophilic polymers such as polyvinylpyrrolidone; amino acids such as glycine, glutamine, asparagine, histidine, arginine, or lysine; carbohydrates such as monosacchandes, disaccharides, glucose, mannose, or dextrins; chelating agents such as EDTA; sugars such as sucrose, mannitol, trehalose or sorbitol; salt-forming counter-ions such as sodium; metal complexes (e.g. Zn-protein complexes); and non-ionic surfactants such as TWEEN or polyethylene glycol (PEG).

The administering physician can determine optimum dosages, dosing methodologies and repetition rates. In certain embodiments, dosage is from 0.01 μg to 100 mg per kg of body weight, and can be given once or more times. In certain embodiments, the dosage of the antibody is from about 0.1 mg to about 20 mg per kg of body weight. The treating physician can estimate repetition rates for dosing based on measured residence times and concentrations of the drug in bodily fluids or tissues.

Controlled-release parenteral formulations can be made as implants, oily injections, or as particulate systems. For a broad overview of protein delivery systems see, Banga, A. J., Therapeutic Peptides and Proteins: Formulation, Processing, and Delivery Systems, Technomic Publishing Company, Inc., Lancaster, Pa., (1995). Particulate systems include microspheres, microparticles, microcapsules, nanocapsules, nanospheres, and nanoparticles. Microcapsules contain the therapeutic protein, such as a cytotoxin or a drug, as a central core. In microspheres the therapeutic is dispersed throughout the particle. Particles, microspheres, and microcapsules smaller than about 1 m are generally referred to as nanoparticles, nanospheres, and nanocapsules, respectively. Capillaries have a diameter of approximately 5 m so that only nanoparticles are administered intravenously. Microparticles are typically around 100 m in diameter and are administered subcutaneously or intramuscularly. See, for example, Kreuter, J., Colloidal Drug Delivery Systems, J. Kreuter, ed., Marcel Dekker, Inc., New York, N.Y., pp. 219-342 (1994); and Tice & Tabibi, Treatise on Controlled Drug Delivery, A. Kydonieus, ed., Marcel Dekker, Inc. New York, N.Y., pp. 315-339, (1992).

Polymers can be used for ion-controlled release of antibody compositions disclosed herein. Various degradable and nondegradable polymeric matrices for use in controlled drug delivery are known in the art (Langer, *Accounts Chem. Res.* 26:537-542, 1993). For example, the block copolymer, polaxamer 407, exists as a viscous yet mobile liquid at low temperatures but forms a semisolid gel at body temperature. It has been shown to be an effective vehicle for formulation and sustained delivery of recombinant interleukin-2 and urease (Johnston et al., *Pharm. Res.* 9:425-434, 1992; and Pec et al., *J. Parent. Sci. Tech.* 44(2):58-65, 1990). Alternatively, hydroxyapatite has been used as a microcarrier for controlled release of proteins (Ijntema et al., *Int. J. Pharm.* 112:215-224, 1994). In yet another aspect, liposomes are used for controlled release as well as drug targeting of the lipid-capsulated drug (Betageri et al., Liposome Drug Delivery Systems, Technomic Publishing Co., Inc., Lancaster, Pa. (1993)). Numerous additional systems for controlled delivery of therapeutic proteins are known (see U.S. Pat. Nos. 5,055,303; 5,188,837; 4,235,871; 4,501,728; 4,837,028; 4,957,735; 5,019,369; 5,055,303; 5,514,670; 5,413,797; 5,268,164; 5,004,697; 4,902,505; 5,506,206; 5,271,961; 5,254,342 and 5,534,496).

The compositions can be administered using any suitable delivery method including, but not limited to, intramuscular, intravenous, intradermal, mucosal, and topical delivery. Such techniques are well known to those of skill in the art. More specific examples of delivery methods are intramuscular injection, intradermal injection, and subcutaneous injection. However, delivery need not be limited to injection methods.

In some embodiments, the composition is administered parenterally. Suitable parenteral administration routes include intravascular administration (e.g. intravenous bolus injection, intravenous infusion, intra-arterial bolus injection, intra-arterial infusion and catheter instillation into the vasculature); peri- and intra-tissue administration; subcutaneous injection or deposition including subcutaneous infusion (such as by osmotic pumps); direct (e.g., topical) application to the area at or near the site of interest, for example by a catheter or other placement device; and inhalation.

The compositions can be administered in a single dose or in multiple doses. Where the administration of a composition is by infusion, the infusion can be a single sustained dose or can be delivered by multiple infusions.

One skilled in the art can also readily determine an appropriate dosage regimen for administering the compositions for preventing, reducing or attenuating acute kidney injury in a given subject. For example, the composition(s) can be administered to the subject once, such as by a single injection or deposition. In some embodiments, the composition(s) can be administered to a subject once, twice or three times prior to surgery, during surgery, and/or shortly following surgery. Where a dosage regimen comprises multiple administrations, it is understood that the effective amount of composition(s) administered to the subject can comprise the total amount of composition(s) administered over the entire dosage regimen.

Screening Methods

In some embodiments, the invention provides a screening method for ouabain binding agents to determine their ability to prevent, reduce or attenuate acute kidney injury during surgery.

In some embodiments, the invention provides a method of screening for agents that prevent, reduce or attenuate acute kidney injury during surgery, comprising
  i) combining a suspected ouabain binding agent and one or more of ouabain, digoxin or a derivative thereof;
  ii) detecting binding of the suspected ouabain binding agent and ouabain, digoxin or a derivative thereof;
  iii) administering the suspected ouabain binding agent to a subject undergoing surgery; and
  iv) assaying kidney function in the subject.

In some embodiments, the kidney function is assayed in the subject both prior to surgery and after the surgery, wherein the kidney function prior to surgery is compared with the kidney function after surgery.

In some embodiments, suspected ouabain binding agents that do not impair kidney function relative to that shown in control subjects would be expected to prevent, reduce or attenuate acute kidney injury during surgery.

In another embodiment, the invention provides a method of screening for a suspected ouabain binding agent that prevents, reduces or attenuates acute kidney injury in a subject, comprising
  i) administering an effective amount of the suspected ouabain binding agent to a subject;
  ii) subjecting the subject to a condition that results in renal ischemia or hypoxia for a period of time;
  iii) obtaining a blood sample from the subject at one or more time points;
  iv) assaying the blood sample to measure a quantity of neutrophil gelatinase-associated lipocalin in the sample; and
  v) comparing the quantity of neutrophil gelatinase-associated lipocalin measured to a control.

In some embodiments, the agent is capable of preventing, reducing or attenuating acute kidney injury in the subject when the quantity of neutrophil gelatinase-associated lipocalin in the sample is reduced relative to the control.

In some embodiments, the quantity of neutrophil gelatinase-associated lipocalin measured is compared to a baseline value obtained from a point in time before the subject was subjected to the condition that results in renal ischemia or hypoxia.

In some embodiments, the subject is administered ouabain prior to being subjected to the condition that results in renal ischemia or hypoxia for a period of time.

In some embodiments, the ouabain is administered via a subcutaneous pump.

In some embodiments, the ouabain is administered at a dose of about 30 μg/kg/day.

In some embodiments, the suspected ouabain binding agent is administered more than one time.

In some embodiments, the subject has been uni-nephrectomized.

In some embodiments, the condition that results in renal ischemia or hypoxia for a period of time comprises clamping a renal artery to reduce blood flow and removing the clamp after a period of time. In some embodiments, the renal artery is clamped for about 20 minutes or less.

In some embodiments, the condition that results in renal ischemia or hypoxia for a period of time comprises surgery.

In some embodiments, the method further comprises detecting binding of ouabain to the suspected ouabain binding agent.

In some embodiments, blood samples are collected at about 1 day, about 2 days, about 3 days, and about 4 days after the subject is subjected to the condition that results in renal ischemia or hypoxia. In some embodiments, the blood samples are collected at about 6 days and at about 12 days after the subject is subjected to the condition that results in renal ischemia or hypoxia. In some embodiments, the blood sample is processed to obtain a plasma sample.

The methods employed to quantify the neutrophil gelatinase-associated lipocalin in the sample is not necessarily limiting. In some embodiments, the neutrophil gelatinase-associated lipocalin is measured by ELISA.

The binding of the ouabain (or digoxin or a derivative thereof such as digoxindicarboxymethoxylamine (DDMA)) to the suspected binding agent can be measured directly or indirectly. In some embodiments, the binding is determined by assaying the ability of the binding agent to remove ouabain (or digoxin or a derivative thereof such as digoxindicarboxymethoxylamine (DDMA)) from a $Na^+/K^+$-ATPase. See, e.g., Kent et al., *Brain Res* 1018: 171-180, 2004; Cano et al., *Toxicol Lett* 85: 107-111, 1996, which is incorporated by reference herein. In some embodiments, binding of ouabain (or digoxin or a derivative thereof such as digoxindicarboxymethoxylamine (DDMA)) to a suspected ouabain binding agent can involve competition with a competitor compound, such as a labeled competitor.

The suspected binding agents are not limiting and examples include antibodies, lipids, peptides, carbohydrates, or small molecules which bind to ouabain. These agents can be selected and screened 1) at random, 2) by a rational selection or 3) by design using for example, ligand modeling techniques (e.g., computer modeling).

For random screening, agents such as antibodies, small molecules, lipids, peptides, carbohydrates, pharmaceutical agents and the like can be selected at random and assayed for their ability to bind to or block the interaction of ouabain to a $Na^+/K^+$-ATPase or other binding partner.

Alternatively, agents may be rationally selected or designed. As used herein, an agent is said to be "rationally selected or designed" when the agent is chosen based on the configuration of the ouabain or its binding target.

In some embodiments, the subject is a mammal, such as a rat or a mouse. In some embodiments, the kidney function is assayed by measuring levels of creatinine relative to a control. In some embodiments, the assay is performed using a mammal such as a rat (e.g., a retired breeder rat) and the subject is subjected to a surgical procedure that comprises a renal ischemia and reperfusion (RIR) model.

Application of the teachings of the present invention to a specific problem is within the capabilities of one having ordinary skill in the art in light of the teaching contained herein. Examples of the compositions and methods of the invention appear in the following non-limiting Examples.

EXAMPLES

Example 1. Effect of DIGIFAB on Plasma Creatinine in Rats Following Renal Ischemia and Reperfusion (RIR)

Figure 7:
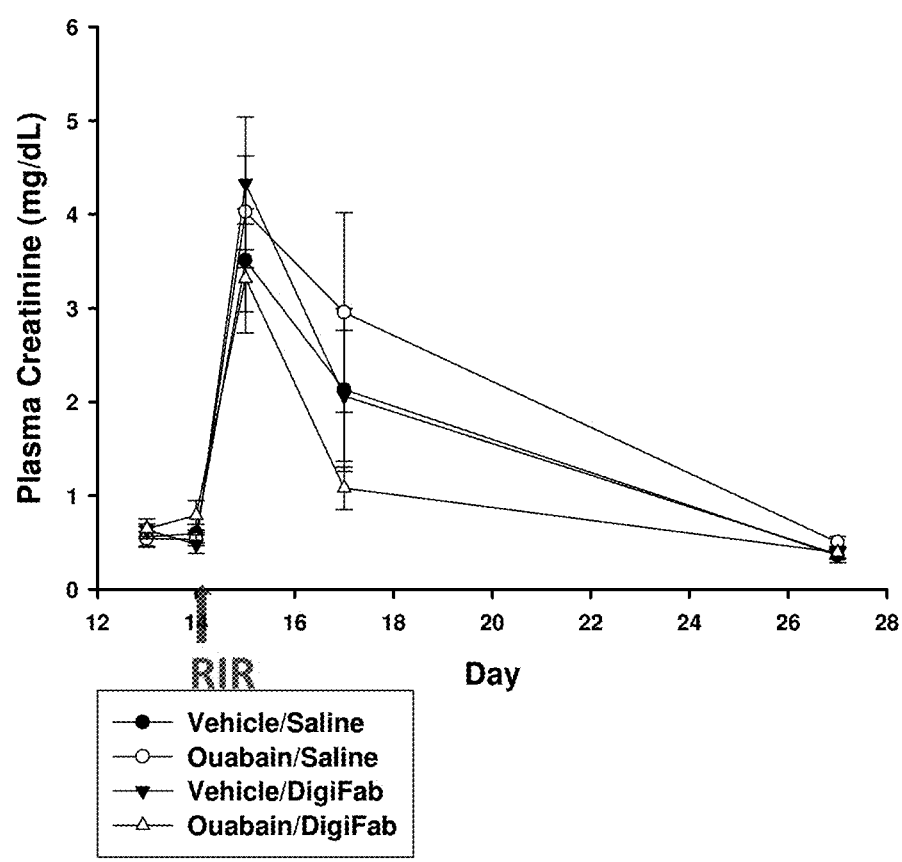
FIG. 7. Effect of DIGIFAB on plasma creatinine in rats following renal ischemia/reperfusion (RIR). Normal male Wistar rats were implanted on "Day 0" with a subcutaneous minipump to deliver ouabain (10 μg/kg/day: open symbols) or vehicle (6 μl/day; solid symbols). Beginning on Day 13, half of the ouabain-infused rats and half of the vehicle-infused rats were injected with DigiFab (triangles), and the remainder (circles) were injected with an equal volume of saline: The DigiFab-treated rats received 0.2 ml DigiFab (10 mg/ml) at 15 hr and 6 hr, and 0.1 ml DigiFab 1 hr pre-operatively. On Day 15, one hour after the last injection, the rats underwent a laparotomy and bilateral renal pedicle clamping for 45 min (RIR surgery; both renal arteries, renal veins and ureters were clamped). The rats were then permitted to recover with standard post-op care. Bloods were drawn: on Day 0 before minipump implantation, on Day 13 before the first injection, 1 hr before the RIR surgery on Day 14, on Days 15 and 17 (24 and 72 hrs post-op), and prior to euthanasia on day 27. Plasma creatinine was measured with a commercial creatinine enzymatic assay kit. The "Day 0" mean plasma creatinine (not shown) was 0.68±0.07 mg/dL in the 49 rats prior to any treatment, similar to the mean value on Day 13, 0.60 mg/dL. Note that the RIR surgery induced about a 6- to 7.5-fold increase (on average) in plasma creatinine level in the rats at 24 hrs post-op (i.e., Day 15). The subsequent decline toward baseline (measured at 72 hrs; i.e., Day 17) was more rapid (i.e., the slope was steeper) in the DigiFab-injected rats than in the saline-injected rats. This indicates that DigiFab accelerated the recovery from the RIR (i.e., acute renal injury, AKI). Symbols correspond to data from 8-11 rats.

Male Wistar ICS rats (~300 g) on normal diet were implanted on "Day 0" with a subcutaneous minipump to deliver ouabain—see FIG. 7—(10 µg/kg/day; open symbols) or vehicle (6 µl/day; solid symbols). Beginning on Day 13, half of the ouabain-infused rats and half of the vehicle-infused rats were injected with DIGIFAB (triangles), and the remainder (circles) were injected with an equal volume of saline: The DIGIFAB-treated rats received 0.2 ml DIGIFAB (10 mg/ml) at 15 hr and 6 hr, and 0.1 ml DIGIFAB 1 hr pre-operatively. On Day 15, at the appropriate time following the DIGIFAB or Saline injections, the rats underwent a laparotomy and bilateral renal pedicle clamping for 45 min (RIR surgery; both renal arteries, renal veins and ureters were clamped). The rats were then permitted to recover with the usual post-op care. Bloods were drawn for plasma creatinine measurements: on Day 0 before minipump implantation, on Day 13 before the first injection, 1 hr before the RIR surgery on Day 14, on Days 15 and 17 (24 and 72 hrs post-op), and prior to euthanasia on day 27. Plasma creatinine was measured after ultrafiltration with 10K filters using a slightly modified rat creatinine enzymatic assay kit (Crystal Chem, Inc., Elk Grove Village, IL). The data are shown in FIG. 7. Symbols correspond to data from 8-10 rats. The "Day 0" data are not shown in order to expand the remainder of the graph; the mean plasma creatinine was 0.68±0.07 mg/dL in the 49 rats prior to any treatment, similar to the value on Day 13, 0.60 mg/dL. Note that the RIR surgery induced about a 6- to 7.5-fold increase (on average) in plasma creatinine level in the rats at 24 hrs post-op (i.e., Day 15). The subsequent decline toward baseline (measured at 72 hrs; i.e., Day 17) was more rapid (i.e., the slope was steeper) in the DigiFab-injected rats than in the saline-injected rats. The latter indicates that DigiFab accelerated the recovery from the RIR (acute renal injury, AKI).

Notes: The large standard errors at the 24 and 72 hr post-op time points (Days 15 and 17) is due to several factors: 1. The relatively small number of rats (δ-10) in each group. 2. The renal insult is very severe, and the extent of injury is somewhat variable from animal to animal. 3. The time of the peak rise in creatinine is variable and, in some animals, may occur earlier or, in many animals, much later than the 24 hr time point selected for blood sampling. Importantly, the renal injury induced by the long (45 min) ischemia period in these rats is far more severe than occurs in human CABG patients at high risk for acute kidney injury (AKI). In these patients an increase in plasma creatinine of only about 25-50% is expected post-op (vs the 600-750% increase in rats).

DIGIFAB accelerates the recovery of plasma creatinine following 45 min of renal ischemia (RIR surgery; see FIG. 7 for methods and time-course). Shown below are the percentage return of the plasma creatinine toward the baseline in the 48 hr period from 24 hrs post-op (the "peak") to 72 hrs post-op. The data are presented as the % of maximal recovery observed at 72 hrs post-op. The "Maximal Recovery" is the difference between the plasma creatinine at 24 hrs post-op and the average level for the group at Day 27 (13 days post-op) when the creatinine should have recovered completely (FIG. 7).

Condition Percent Recovery (±SE; "n" is the Number of Rats)
Infusion/Injection
  Vehicle/Saline=50.6±18.9% (n=8)
  Ouabain/Saline=38.6±17.5% (n=9)
  Vehicle/DIGIFAB=61.6±19.5% (n=9)
  Ouabain/DIGIFAB=68.1±11.2% (n=9)

Grouping of the DIGIFAB-Injected and Saline-Injected Rats:

Vehicle/Saline+Ouabain/Saline=44.2±12.5% (n=17)
Vehicle/DIGIFAB+Ouabain/DigiFab=64.9±11.0% (n=18)

Thus, on average, DIGIFAB accelerated the recovery of the plasma creatinine level by about 45% during the 48 hr period following the post-op peak in plasma creatinine (at 24 hr). The RIR surgery model is the standard in the field, but this surgery caused a 6 to 7.5-fold increase in plasma creatinine (comparable to that observed by others), which is far higher than the 25-50% increase we anticipate in CABG surgery patients at high risk for acute kidney injury (AKI). We anticipate that the effectiveness of DIGIFAB may be further enhanced when the renal injury is much milder as it is in clinical situations such as in CABG surgery patients or other patients undergoing major surgeries.

Example 2. Effects of DIGIFAB on Blood Pressure in Salt-Restricted Rats

We postulate that lowering plasma EO with DIGIFAB prior to and during CPB surgery should reduce the incidence of post-operative (post-op) AKI and, thus, reduce post-op morbidity and mortality. It is prudent to verify, in an animal model, that, if EO is elevated, DIGIFAB does not cause the BP to drop precipitously. Importantly, DIGIFAB is approved for clinical use. It has very few side-effects, and a precipitous drop in BP has not been reported with its use, even in patients with heart failure (Chan & Buckley, *Clin Toxicol (Phila)* 52: 824-836, 2014; Schaeffer et al., *J Am Osteopath Assoc* 110: 587-592, 2010).

In a control experiment, the effects of DIGIFAB and CroFab were tested on mean blood pressure (MBP monitored by telemetry) in normal wild-type C57Bl/6 mice (with normal plasma EO). [Note: CroFab, anti-crotalus toxin fab fragments, was employed as a Fab control because CroFab is generated in a similar manner to DIGIFAB.] The baseline 12 hr MBP was 108.5±0.8 mm Hg (n=5 mice); MBP was measured on 4 days before intraperitoneal (ip) injection of DIGIFAB, on the day between DIGIFAB and CroFab injections, and on the day after CroFab injection. The same mice were injected ip with two doses of DIGIFAB (40 mg/kg per dose) 4 hrs apart; MBP was measured and averaged during hrs 2-4 after each dose. One day later, two comparable doses of Crofab were administered ip 4 hrs apart and MBP was measured and averaged during hrs 2-4 after each dose. MBP in DIGIFAB-treated mice=111.8±0.6 mm Hg and 112.2±1.9 mm Hg in CroFab-treated mice (n=5). Thus, neither DIGIFAB nor CroFab affected MBP in normal mice.

For a high EO model, we chose salt-depleted rats because salt depletion or restriction elevates plasma EO in humans (Manunta et al., *Am J Physiol Regul Integr Comp Physiol* 290:R553-R559, 2006) and rodents (Blaustein et al., *Hypertension* 62: A19, 2013). In this model, the high EO may be needed to help maintain BP. In a preliminary experiment (FIG. 1A, B), DIGIFAB lowered mean BP in rats on a 0.4% NaCl diet by ≈9% (from ≈106 to ≈97 mm Hg), while CroFab (anti-crotalus toxin fab fragments, employed as a Fab control) had no effect. Thus, EO appears to sustain ≤10% of BP even under these stress conditions.

In the study reported here, normal rats were fed either a standard diet or a low (0.04%) salt diet for two weeks. Then, when we expected plasma EO to be elevated in the LS rats, all the rats were injected intraperitoneally (ip) with either DIGIFAB or CroFab shortly before, and during anesthesia (to mimic surgery), while monitoring BP and heart rate by telemetry. Neither fab fragment preparation had a significant effect on BP and heart rate in this experiment.

Materials and Methods

Animals and diets: Normal male Sprague-Dawley rats (Charles River, Spencerville, OH, USA), 250-300 gm, were used for this study. The rats were fed standard rat chow with 0.4% NaCl (NS) or a 0.04% NaCl chow (LS), both from Dyets, Inc. (Bethlehem, PA, USA), as noted in Results.

Ethical approval: All procedures involving rats complied with the standards stated in the National Institutes of Health Guide for the Care and Use of Laboratory Animals and were approved by the University of Maryland Animal Care and Use Committee.

Blood pressure monitoring by telemetry: Rats were anaesthetized with isoflurane supplemented with 100% $O_2$. The right common carotid artery was exposed and ligated via an anterior neck midline incision. Telemetric BP sensors (DSI TA11PA-C40, Data Science International, Minneapolis, MN, USA) were used. The catheter of the BP sensor was inserted into a small hole proximal to the ligature and the tip was passed to the origin of the carotid at the aortic arch. The catheter was then fixed in place with a suture and the hole was sealed with adhesive (Vetbond, 3M, St. Paul, MN, USA). The body of the sensor was passed through a subcutaneous tunnel to a subcutaneous pocket in the abdominal wall. Following 7-10 days of recovery from surgery, BPs were recorded with DSI receivers and software. Three baseline 24 hr BPs were recorded with the rats on the NS diet. The rats were then either continued on the NS diet, or fed a LS diet to elevated plasma EO. Details of the experimental protocol are given in Results.

Binding of Ouabain (EO) and Digoxin to DIGIFAB

The procedure was based on Ward et al. *Therapeutic Drug Monitoring* 22: 599-607, 2000, which was modified to determine free and total ouabain in the presence of DIGIFAB. In brief, a vial of DIGIFAB was reconstituted per the manufacturer's instructions, and was diluted $10^5$-fold with a radioimmunoassay (RIA) buffer containing phosphate buffered saline (pH 7.4) and bovine serum albumin (1% w/v). The antibody (Fab) fragments were added to the buffer with various concentrations of $^3$H-ouabain (0.097-1.97 nM) and were incubated for 2 hr at room temperature. The samples were passed through glass fiber filters using a Brandel (Gaithersberg, MD, USA) cell harvestor to separate free and bound ouabain. The bound ouabain on the filters was determined by liquid scintillation counting (Beckman TA5000; Beckman-Coulter, Brea, CA, USA).

We also employed a competition assay to measure the displacement of $^3$H-ouabain by digoxin in order to compare DIGIFAB and DIGIBIND, using a long-expired (July 1993), deep-frozen, unopened vial of DIGIBIND. In this experiment, the Fab fragments (diluted as described for DIGIFAB) and $^3$H-ouabain (0.88 nM) were incubated at room temperature for 2 hr in the presence of various concentrations of digoxin (0.01-30 nM). The reaction was terminated by rapid filtration, as above. The data were fitted, using iterative non-linear regression, to an equation of the form:

$$\text{Bound} = \text{Bound}_{Min} + (\text{Bound}_{Max} - \text{Bound}_{Min})/(1 + ([\text{Digoxin}]/EC_{50})^{Hill\ Slope}$$

Materials and solutions: DIGIFAB (Lot BN201207, exp November 2016) and CroFab (Lot BN201498, exp April 2018) were generously provided by BTG Int., Inc. (West Conshohocken, PA, USA); DIGIBIND was a generous gift from Burroughs-Welcome (Durham, NC, USA). Ouabain, digoxin and E-64 [(1S,2S)-2-(((S)-1-((4-guanidinobutyl)amino)-4-methyl-1-oxopentan-2-yl)carbamoyl)cyclopropanecarboxylic acid] were purchased from Sigma-Aldrich (St. Louis, MO, USA); $^3$H-ouabain was purchased from Perkin-Elmer (Oakbrook, IL, USA); isofluorane was from Henry Schein (Dublin, OH, USA).

Statistics: BP values are shown as means±S.E. of n values. Student's t-test and one-way ANOVA were used as indicated in Results. Data for the binding experiments are the average of duplicate measurements.

Results

Binding of ouabain and digoxin to DIGIFAB: To verify that sample of DIGIFAB employed for the in vivo studies (below) binds ouabain with high affinity, we incubated $^3$H-ouabain with DIGIFAB and separated the bound from the free ouabain by rapid filtration thru glass fiber filters. The results are presented as a Scatchard Plot in FIG. 2, and in tabular form (Table 1). This analysis showed the presence of two classes of binding sites for ouabain. The key finding is that both classes of binding sites bind ouabain with high affinity (Site 1=361 pM; Site 2=2.09 nM).

TABLE 1

(see FIGS. 2 and 3): Binding affinities of DIGIFAB and DIGIBIND for 3H-ouabain and digoxin.

|  | Affinity for $^3$H-Ouabain | Affinity for Digoxin |
|---|---|---|
| DIGIFAB |  |  |
| Binding Site 1 | 361 pM | 193 +/− 16 pM |
| Binding Site 2 | 2.09 nM | Not visible in expt |
| DIGIBIND |  |  |
| Binding Site 1 | 330 pM | 207 +/− 22 pM |
| Binding Site 2 | 1.95 nM | ~3 nM * |

* estimated

Figure 2:
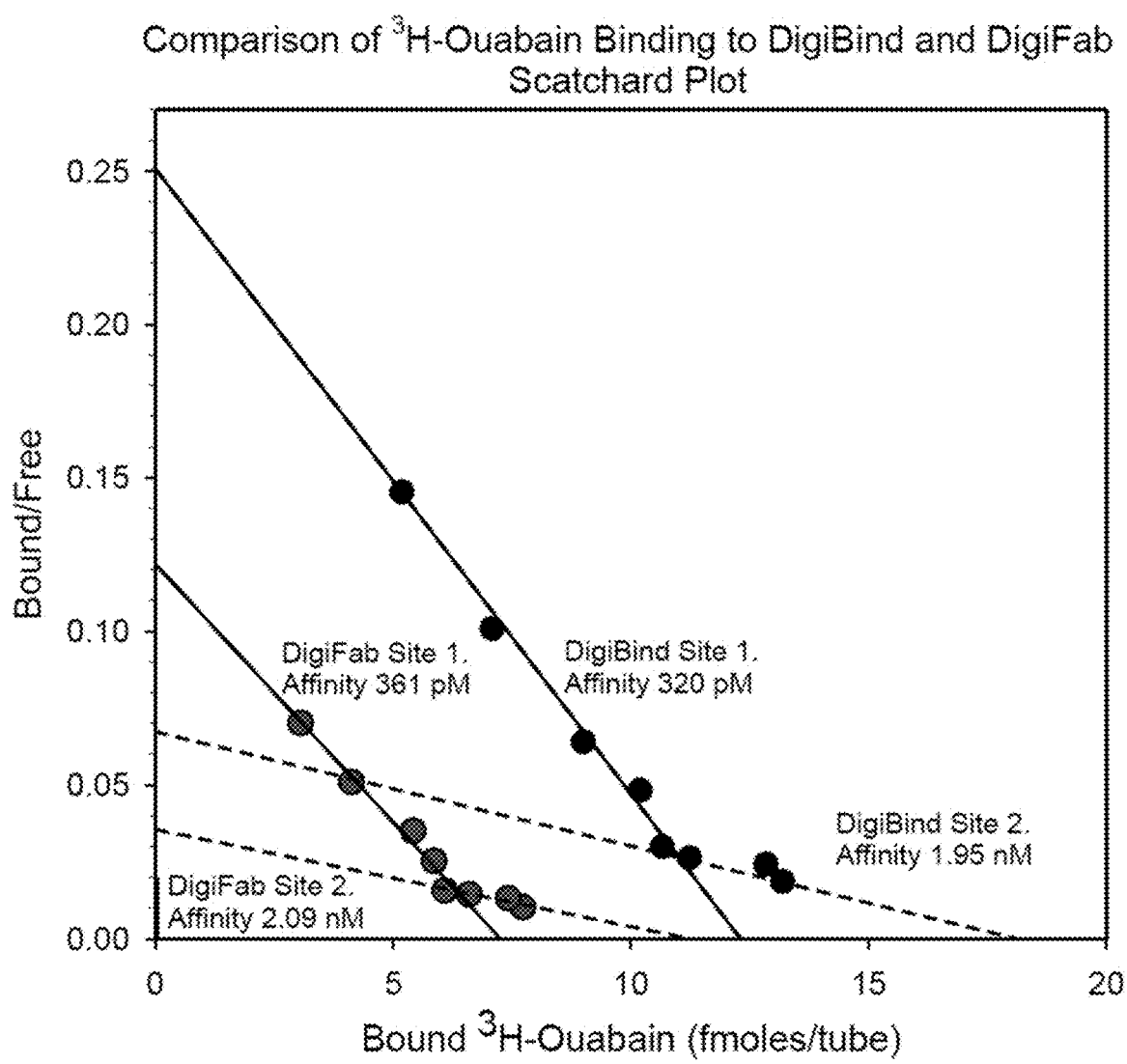
FIG. 2. $^3$H-Ouabain binding to DIGIBIND and DIGIFAB Scatchard plot. The affinities of the two binding sites on both DIGIBIND and DIGIFAB are shown on the graph.
Figure 3:
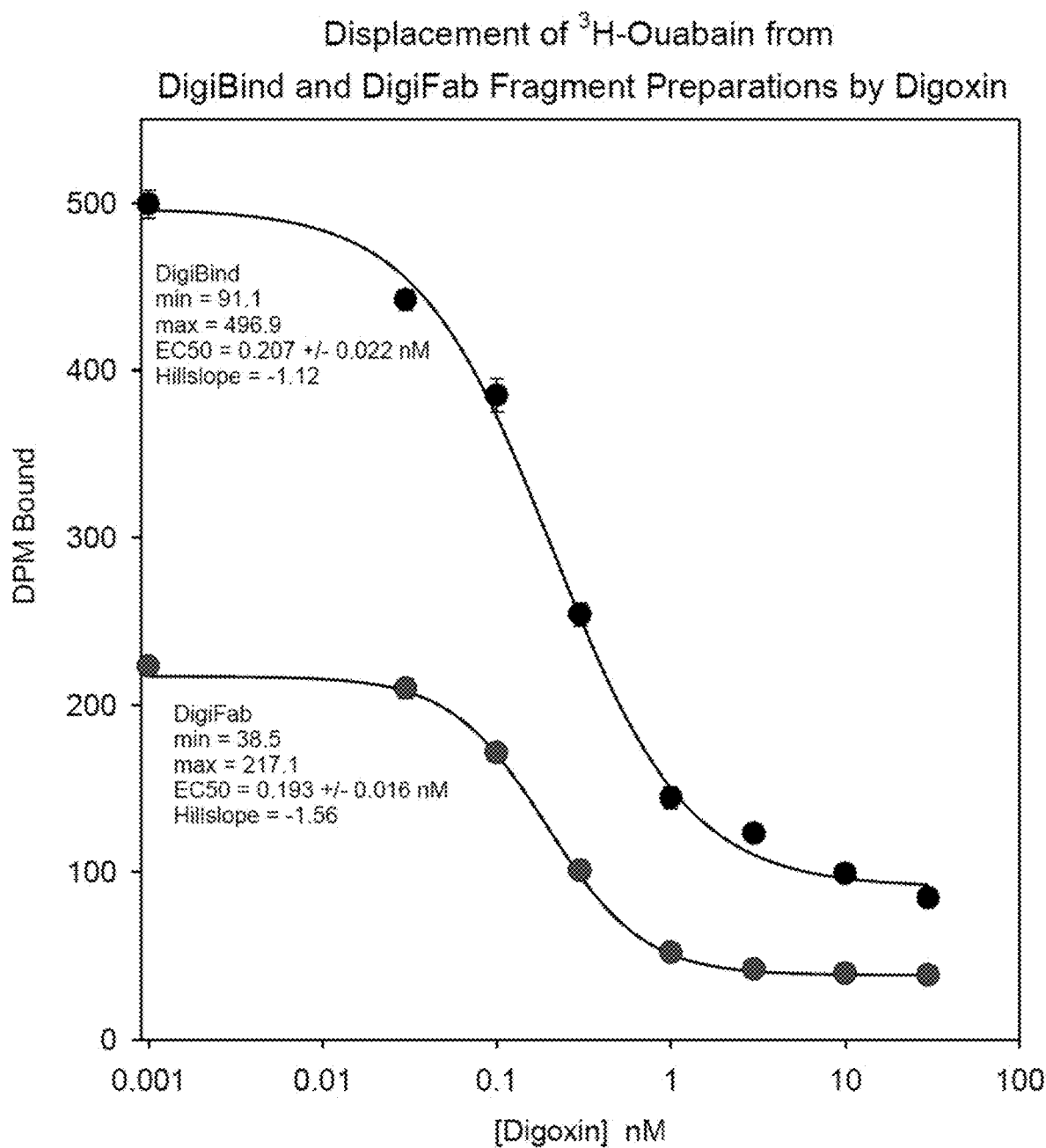
FIG. 3. Displacement of $^3$H-Ouabain from Fab fragment preparations by digoxin. The effective concentrations for half-maximal binding ($EC_{50}$'s) by DIGIBIND and DIGIFAB are shown on the graph.
Figure 4:
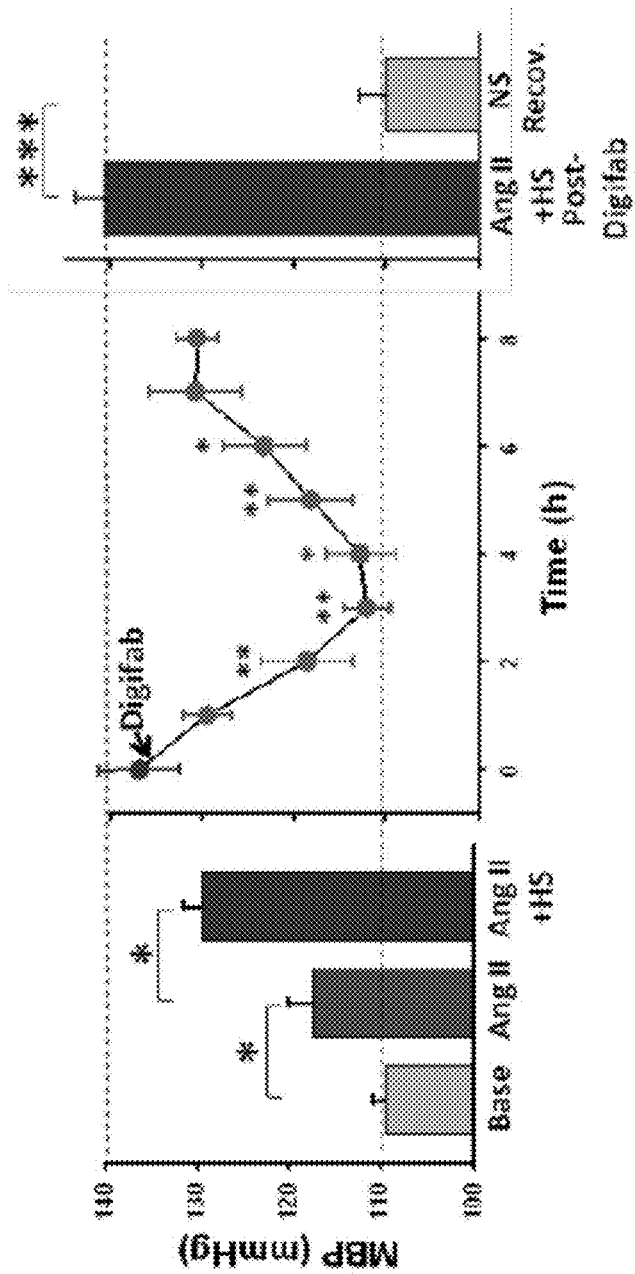
FIG. 4. Acute delivery of DIGIFAB by intraperitoneal (ip) injection in angiotensin II+high salt diet (Ang+HS) hypertensive mice. DIGIFAB normalizes BP in Ang+HS hypertensive mice. Bars=24 hr MBP at baseline, after 350 ng Ang II/kg/min×8 days, after Ang+HS (6% NaCl)×8 days, and after recovery (NS). DIGIFAB (60 mg/kg ip) lowered MBP to baseline at 3-4 hr. *P<0.05; P<0.01; *P<0.001; ANOVA; n=6.
Figure 5:
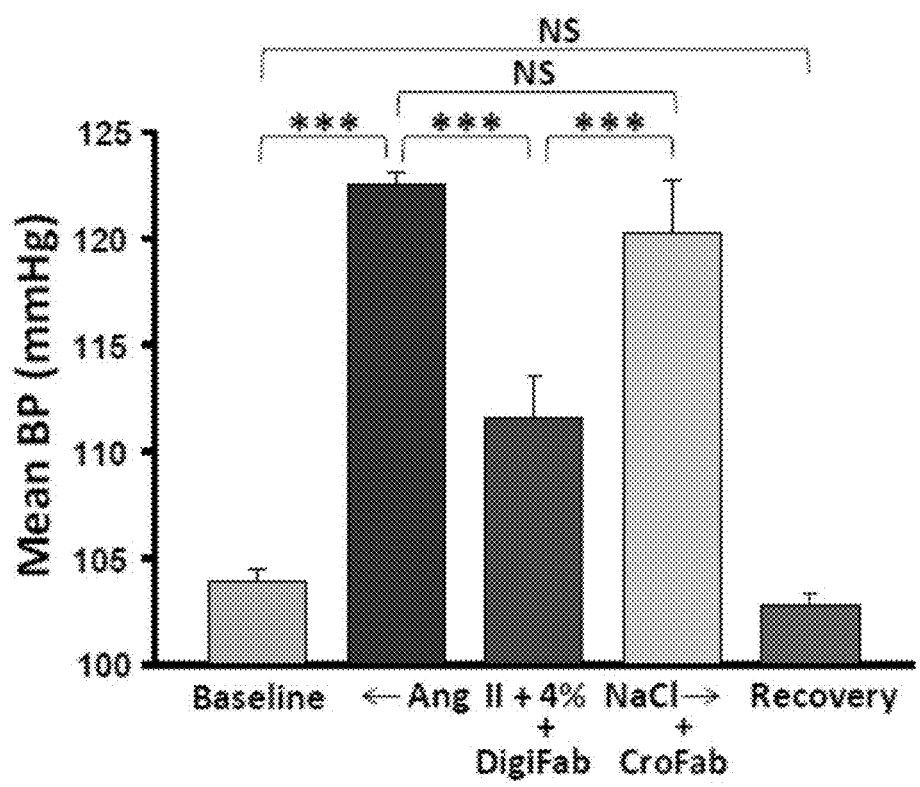
FIG. 5. Acute delivery of DIGIFAB and CroFab ('control') by ip injection. DIGIFAB (ip) selectively lowers BP in Ang II+HS hypertensive mice. Bars=NS day-time MBP at baseline, after 350 ng Ang II/kg/min+HS (4% NaCl)×16 days, and NS recovery. DIGIFAB, but not CroFab (both 10 mg/kg ip), lowered MBP for 4 hrs post intra-peritoneal (ip) injection. ***P<0.001; ANOVA; n=8.
Figure 6:
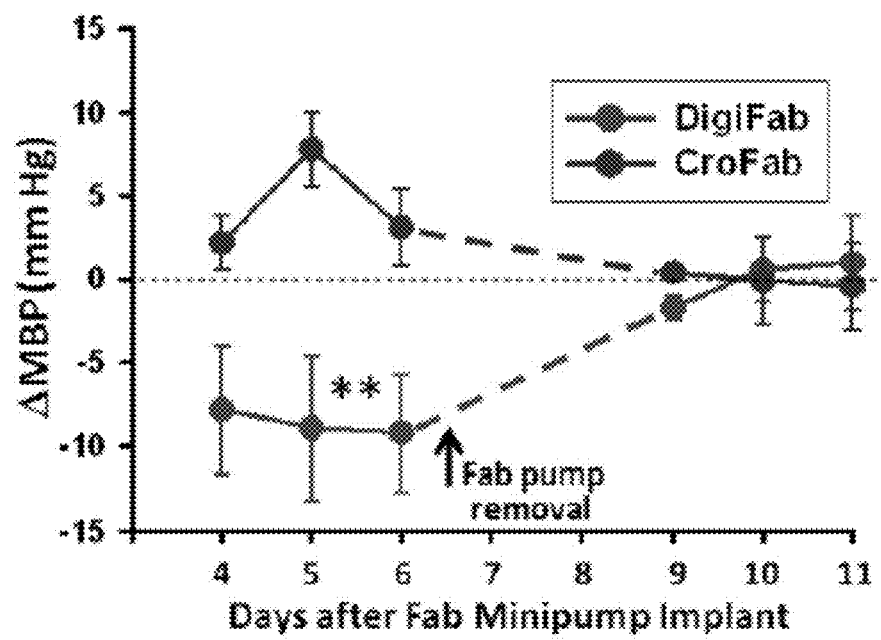
FIG. 6. Chronic delivery of DIGIFAB and CroFab ('control') by subcutaneous 1-week osmotic minipump in Ang+ HS hypertensive mice shows that prolonged treatment with DIGIFAB does not have obvious adverse effects. A. DIGIFAB sc selectively lowers BP in Ang II+HS hypertensive mice (time course). Fab 7 day minipumps implanted on day 19 of 350 ng/kg Ang II/min+HS (4% NaCl); MBP=131±4 mm Hg. DIGIFAB (n=5), but not CroFab (n=3), both 10.7 mg/kg/day, sc, lowered MBP. **P<0.01 vs CroFab and recovery; ANOVA. B. Bar graph of data from panel A.
Figure 6:
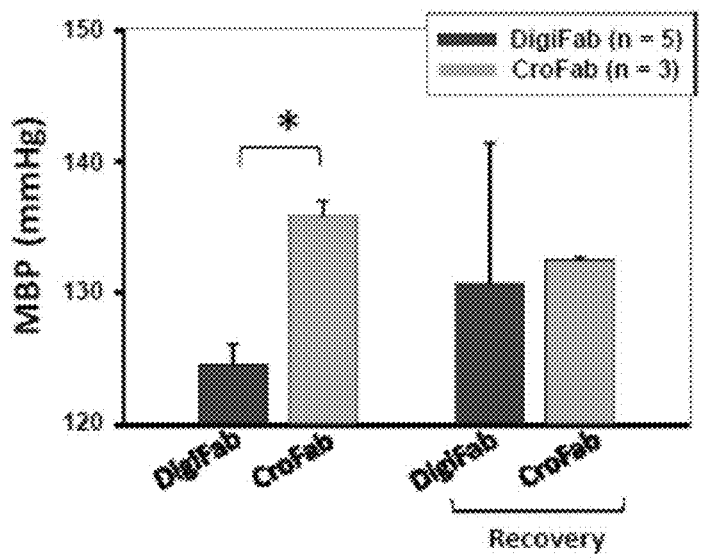

For comparison, we also measured the binding of ouabain to DIGIBIND. The results were very similar to those for DIGIFAB (DIGIBIND Site 1 affinity for ouabain=330 pM; Site 2=1.95 nM; FIG. 2 and Table 1). In addition, we measured the displacement of $^3$H-Digoxin from DIGIFAB and DIGIBIND in a simple competitive assay. The data indicate that the apparent affinity of the Fab fragments for digoxin is greater than for ouabain (FIG. 3 and Table 1), as previously reported (Pullen et al., *J Pharmacol Exp Therap* 310: 319-325, 2004; Pullen et al. *J Immunol Meth* 336: 235-241, 2008).

Lability of DIGIFAB; protection by peptidase inhibition: The DIGIFAB package insert states that the diluted ("reconstituted") product should be used "promptly" or may be stored "at 2° to 8 . . . for up to 4 hours." We observed that, when the diluted DIGIFAB was reconstituted and stored for 24 hrs at 5° C., its ouabain binding capacity decreased by >90%. A likely possibility is that the fab fragments may have been digested by residual peptidases in the preparation (see DIGIFAB package insert). We attempted to inactivate these peptidases by adding the irreversible cysteine peptidase inhibitor, E-64 (Scott & Whitton, Transfusion, 28:24-28, 1988; Gour-Salin et al., *Biochem J*, 299:389-392), at a final concentration of 1 µM, to the diluted DIGIFAB. This markedly improved the stability of DIGIFAB's ouabain binding capacity. For example, following Fab reconstitution, storage of the solution for 24 hr at room temperature led to a 90% loss of $^3$H-ouabain binding, whereas no loss of activity was observed when E-64 was included.

Effects of DIGIFAB and CroFab on BP in normal rats on standard and low salt diets: Based on preliminary data that plasma EO is modestly elevated in rats on a salt-restricted diet, and that DIGIFAB lowers BP modestly in these rats (Blaustein et al., *Hypertension* 62: A19, 2013), we used rats fed a low salt (0.04% NaCl) diet to determine the effect of DIGIFAB on BP under physiological conditions know to elevate circulating EO (see FIG. 1). After collecting baseline telemetric 24 hr BP data, normal Sprague-Dawley rats were fed either a NS (n=3) or an LS diet (n=4). On days 14-16, 24 hr BP data were again collected. On day 17, after a 4 hr BP recording, both the NS and LS diet mice each received two injections, 4 hr apart, of 10 mg/kg DIGIFAB or CroFab. BP was continuously monitored during this 8 hr period, during the next 4 hr of "recovery", and for the following 24 hr period. Three hrs after the $2^{nd}$ injection, the mice were anesthetized with 2% isofluorane; anesthesia was maintained for the next hour, and the rats remained unresponsive to pinch. On day 19, the injection protocol was repeated, but those mice that had received DIGIFAB on day 17 were injected with Cro Fab, and vice-versa. The rats were continued on their respective NS or LS diets and 24 hr ('recovery') BPs were collected for the next 3 days. BP data collected during the $3^{rd}$ and 4' hours following each injection (i.e., hours 3, 4, 7 and 8, when the effects of the fab fragment injections on BP are stable) were tabulated.

The results are shown in Table 2. The "control" data are for the 4 hr periods preceding the first injection of Fab fragments; or for the "recovery" 4 hr period (starting 4 hrs after the $2^{nd}$ injection). The control and recovery mean BPs (MBPs) are virtually identical to the baseline, 109±2 mm Hg (n=7; the MBP for the 12 hr dark period of the light/dark cycle because mice are nocturnal and the mice were awake and active during the experiments). The results reveal that neither salt restriction nor either Fab fragment preparation altered MBP. Anesthesia may have reduced MBP very slightly, but it was not statistically significant. Similar results were obtained with systolic BP (data not shown). Heart rate (HR) was not affected by the LS diet (420±4 vs NS=411±8 bpm, beats/min; baseline on NS=418±3 bpm) or by injection of either DIGIFAB (410±8 bpm) or CroFab (415±8 bpm). HR was, however, reduced by 5% (P<0.05) during the period of anesthesia (DIGIFAB: 387±5 bpm; CroFab: 392±8 bpm).

TABLE 2

Effects of DIGIFAB and CroFab (both 10 mg/kg, ip) on mean blood pressure (MBP) in rats on a normal diet and rats on a salt-restricted diet (×16 days) in the absence of, and during 2% isoflurane anesthesia (second injection). Aortic arch MBP was measured by telemetry. Anesthesia was induced at the end of hr 7, (3 hours after the second injection of DIGIFAB or CroFab), and was maintained for 1 hour.

| Diet | | DIGIFAB Pre-/post-injection* Control | DIGIFAB (hrs 3, 4 & 7)** | DIGIFAB under anesthesia (hr 8) | CroFab Pre-/post-injection* Control | CroFab (hrs 3, 4 & 7) | CroFab under anesthesia (hr 8)** |
|---|---|---|---|---|---|---|---|
| Normal salt (0.4% NaCl; n = 3 rats) | Mean BP (mm Hg) | 108.1 ± 1.6 109.5 ± 4.2 | 103.2 ± 1.8 | 109.1 ± 4.6 | 105.3 ± 3.8 | 102.9 ± 3.9 | |
| Low salt (0.04% NaCl; n = 4 rats) | | 106.8 ± 5.9 | 105.9 ± 5.4 | 100.8 ± 8.0 | 107.4 ± 5.4 | 107.5 ± 4.7 | 108.0 ± 5.2 |

*Pre- and post-injection MBPs were combined because they were nearly identical. This is also evident in the comparison of the DIGIFAB and CroFab controls.
**MBPs from hrs 3, 4 and 7 were averaged to obtain one value for each rat.

Discussion

DIGIFAB binds ouabain as well as digoxin with very high affinity: A previous report has indicated that, even though DIGIBIND and DIGIFAB have high affinity for both ouabain and digoxin, "there is marked heterogeneity in the complement of antibodies between each Fab preparation (Pullen et al. *J Immunol Meth* 336: 235-241, 2008). We therefore performed an in vitro study of ouabain binding to DIGIFAB binding on the DIGIFAB sample used for our in vivo experiments (below). We observed that DIGIFAB exhibits two classes of high affinity binding sites for ouabain. The highest affinity sites have an affinity for ouabain in the high pM range, whilst the lower affinity sites have an affinity in the low nanomolar range. Further both DIGIFAB and DIGIBIND preparations bind digoxin with very comparable high (i.e., subnanomolar) affinity. These results are in general agreement with prior reports (Pullen et al., *J Pharmacol Exp Therap* 310: 319-325, 2004; Pullen et al. *J Immunol Meth* 336: 235-241, 2008), and indicate that DIGIFAB should provide an effective method for immuno-neutralizing ouabain, both in vivo and in vitro.

Diluted DIGIFAB lability is attenuated by protease inhibition: According to the DIGIFAB package insert, diluted DIGIFAB is quite labile, and should be stored at 2-8° C. and used within 4 hrs. The lability is presumably due to contamination with trace amounts of proteases, especially papain and chymopapain, that are used in the Fab fragment preparation. In a preliminary study, we observed that >90% of the ouabain binding activity was lost after 24 hr of storage of diluted DIGIFAB. To maintain the immuno-neutralizing activity of stored dilute DIGIFAB samples, we tested the effect of the irreversible protease (primarily papain) inhibitor, E-64. This inhibitor improved the stability of the diluted DIGIFAB. Thus, the inclusion of E-64 with DIGIFAB would appear to be of particular utility when osmotic pumps are used for long-term animal dosing studies.

DIGIFAB has little effect on BP, even in salt-restricted (high plasma EO) rats: The primary aim of the present study, as suggested by BTG, was to test whether DIGIFAB might induce marked hypotension under conditions in which plasma EO is elevated by physiological means. The rationale was that circulating EO is elevated in many patients with compromised hearts who undergo CPB surgery, and the highest EO levels are a marker for poor outcomes often manifested by AKI (Bignami et al. *Crit Care Med* 41: 744-755, 2013; Simonini et al. *BioMed Res Int* 2015: 714793, 2015). Because the elevated plasma EO may, itself, trigger renal damage, we have proposed a clinical trial of pre- and peri-operative prophylactic DIGIFAB to determine whether DIGIFAB may prevent AKI in CPB patients. First, however, we needed to be certain that DIGIFAB does not induce a profound hypotension when plasma EO is high. To this end, we measured the effects of ip DIGIFAB injection on BP in normal awake rats and anesthetized rats on a standard (NS) diet and on a salt-restricted (LS=0.04% NaCl) diet. Salt restriction elevates plasma EO in mice (Blaustein et al., *Hypertension* 62: A19, 2013) and humans (Manunta et al., *Am J Physiol Regul Integr Comp Physiol* 290: R553-559, 2006).

Several important observations were made on normal Sprague-Dawley rats in the experiments described here. First, salt restriction, alone, had negligible effect on MBP (<3 mm Hg decrease), comparable to reports in salt-depleted rats (Ott et al., *Am J Physiol,* 256:H1426-H1431, 1988; Jover et al., *Arch Mal Coeur Vaiss,* 82:1989:1329-1332) and humans (Manunta et al., *Am J Physiol Regul Integr Comp Physiol* 290: R553-559, 2006). Second, ip DIGIFAB (and CroFab) had negligible effect on BP and HR in either salt-depleted or salt-replete rats. Further, although isoflurane anesthesia slightly lowered BP (≤5 mm Hg), DIGIFAB did not cause the BP and HR to decline further. Also, while the n's in these experiments were small (3-4 mice), the variance in most measurements was small and calculations reveal that even doubling the n's at constant variance would not be expected to lead to a different result. Moreover, in an earlier, unpublished study we found that DIGIFAB lowered BP by <10% in LS rats (FIG. 1). Thus, the results of the two studies appear consistent.

Conclusion: Because none of the treatments (dietary salt restriction, DIGIFAB±anesthesia or CroFab±anesthesia) significantly altered BP, we conclude that DIGIFAB is expected to be safe when administered to patients with elevated plasma EO levels who are about to undergo CABG surgery. A large drop in BP is not anticipated. The binding data show that DIGIFAB would be a highly effective means to immuno-neutralize the elevated EO. Thus, the available data all indicate that this FDA-approved preparation should be safe and potentially highly efficacious for the prevention of AKI.

Example 3. Pre-Operative Administration of DIGIFAB to Prevent Acute Kidney Injury in Patients Undergoing CABG Surgery The effect of pre-operative administration of DIGIFAB (vs vehicle alone) on the rise in serum creatinine (a measure of kidney function/injury) and several parameters of AKI in patients undergoing CABG surgery is tested.

The trial is double-blinded, and involves 250 high risk (with diabetes and/or a renal glomerular filtration rate <60 ml/min) patients undergoing CABG surgery. Pre-op and post-op serum creatinine and plasma EO is measured. Half the subjects receive two doses of DIGIFAB (3.5 mg/kg), one at 12-15 hrs pre-op, and the second at 1 hr pre-op; half the subjects receive 2 'doses' of vehicle. This study tests the hypothesis that pre-op DIGIFAB will attenuate the post-op rise in serum creatinine and evidence of AKI that often accompanies CABG surgery.

Example 4. DIGIFAB Dosing Calculations

Clinical studies (Simonini M. et al., A new clinical multivariable model that predicts postoperative acute kidney injury: impact of endogenous ouabain. *Nephrol Dial Transplant.* 29(9):1696-701, 2014) indicate that, among CABG patients destined to develop AKI with the greatest frequency, the preoperative plasma EO concentrations range from 133 to 500 pM. Those patients whose circulating EO levels were <133 pM had a negligible risk of AKI. In rats with ouabain infused chronically at 0, 3, 10 and 30 µg/Kg/24 hr the steady state plasma levels were ~0.6, 1.95, 2.2 and 4.8 nM, respectively (Manunta et al., *J Hypertens,* 12:549-560,1994).

In some embodiments, the amount of DIGIFAB required to neutralize the pathologically relevant levels of endogenous ouabain that predispose to acute kidney injury can be based upon the following assumptions.

1. According to the insert provided with DIGIFAB, the maximal digoxin-binding capacity of a single vial (40 mg lyophilized DIGIFAB which is reconstituted with 4 ml sterile water to give 10 mg/ml) is 500 ug (i.e., 640 nmoles, lot 201304). However, the total binding capacity for 3H-ouabain measured in this lot was less, 96 nmoles.
2. The DIGIFAB-$^3$H-ouabain binding interaction was characterized by two main classes of binding sites for 3H-ouabain with apparent affinities of 361 pM and 2.09 nM, respectively.

Assuming the extracellular fluid volume (ECFV) of ~20% of body weight, for a 0.3 kg rat, the ECFV will be 60 ml.

Assuming circulating ouabain at 2 nM (expected as in the experiment of FIG. 7 when 10 g ouabain/kg/day is infused sc), the total amount to be sequestered will be ~120 pmoles. As DIGIFAB has a high but not infinite affinity for endogenous ouabain, it can be imputed (per prior Scatchard analyses described herein) that the probable free/bound ratio in vivo is from 0.05 to 0.1. To achieve that binding ratio, sufficient DIGIFAB will be needed that can maximally bind ~1.2-2.4 nmoles of endogenous ouabain.

A single vial of DIGIFAB can neutralize ~96 nmoles of ouabain (per above). Thus, in most instances, 1 vial would appear to be sufficient for 40 rats.

However, ouabain will be constantly delivered by pump, and DIGIFAB will be given 12-18 hours before ischemia, and DIGIFAB will likely be cleared more rapidly than is the larger Digibind (clearance half-time is ~3 hr; Moran et al., *J Pharm Pharmacol* 46:854-856, 1994). Moreover, the rate of EO re-synthesis is unknown. Therefore it may be prudent to increase the dose of DIGIFAB given by a factor of 5. Thus, one vial would support 8 rats.

In humans too, it is realistic to use the extracellular fluid volume (~20% of body weight) and not plasma volume for the dosing calculation. For a 70 kg individual, the ECFV is ~15 liters. Thus, with circulating EO at 500 pM, the total amount of EO to be sequestered is ~7 nmoles. As DIGIFAB has a high but not infinite affinity for EO, we can impute (per Scatchard analyses) a probable desired free/bound ratio in vivo ranging from ~0.01 to 0.1. The latter value would mean that the free concentration of plasma EO could be reduced from, for example, ~500 pM to 50 pM (i.e., below the 155 pM threshold noted in prior clinical studies on AKI). Therefore it follows that to achieve the above noted range of binding ratios, sufficient DIGIFAB will be needed that can maximally bind ~15-150 nmoles of EO. This does not, however, take into account the rate at which EO is re-synthesized (it is unknown), which may be expected to be increased when plasma EO is lowered, especially under stress conditions such as during CABG surgery.

As a single vial of DIGIFAB (40 mg Fab fragments) can be expected to neutralize at least 96 nmoles of ouabain (per above), in most instances, 1-2 vials of DIGIFAB/patient per dose may be sufficient (depending on body weight). With smaller and lighter patients, especially women, only 1 vial per dose may be needed. These doses are much lower than the doses of DIGIFAB used to treat digoxin toxicity, when the burden of digoxin may be as high as 20 ng/ml and a 70 kg patient may require a dose of 14 vials of DIGIFAB.

DIGIFAB has two unique additional advantages over a ouabain receptor antagonist. First, unlike a receptor antagonist, DIGIFAB sequesters and thereby lowers the free concentration of EO in the circulation which is clinically desirable. Second, Fab fragments are filtered and cleared primarily by the kidney with a half-life of 15-20 hours. This is shorter that the renal clearance of ouabain. Thus, DIGIFAB can lower the total body burden of EO by enhancing its renal excretion.

Example 5. DigiFab Attenuation of the Development of Acute Renal Injury (AKI) in Rats Subjected to Renal Ischemia and Reperfusion (RIR)

This example describes studies that investigate whether pre-operative treatment with DigiFab can attenuate AKI in rats undergoing RIR.

Transient renal ischemia usually results in impaired renal function (AKI) that lasts well beyond the period of ischemia. In humans AKI often complicates the post-operative period following coronary artery bypass graft (CABG) surgery; further, AKI in these patients frequently leads to chronic kidney disease and renal failure with the need for dialysis or renal transplant, and it may be fatal. To date, there is no known treatment or means of preventing AKI.

Digibind (anti-digoxin Fab antibodies) bind ouabain with high affinity (Pullen et al., The Journal of pharmacology and experimental therapeutics 310: 319-325, 2004; Pullen et al., J Immunol Methods 336: 235-241, 2008), but this preparation is no longer commercially available. Therefore we tested whether DigiFab (BTG International, Inc., West Conshohocken, PA), a newer, commercially-available and clinically-approved anti-digoxin Fab antibody preparation also can bind ouabain with high affinity. We also tested whether pre-treatment with DigiFab can attenuate the renal ischemia-reperfusion (RIR)-induced AKI in rats with elevated plasma ouabain levels.

Protocol and Methods:
Assay of Ouabain Binding by Fab Fragment Preparations:
Digibind (an anti-digoxin Fab preparation that is no longer available in the US) was shown to bind ouabain with high affinity (Pullen et al., The Journal of pharmacology and experimental therapeutics 310: 319-325, 2004; Pullen et al., J Immunol Methods 336: 235-241, 2008) but there is no comparable information available for DigiFab. To determine if DigiFab, too, binds ouabain with high affinity, we incubated various concentrations of $^3$H-ouabain with DigiFab and separated bound ouabain from free ouabain by rapid filtration over 10 k MW cut-off glass fiber filters. For comparison, we also measured the binding of ouabain to Digibind that had been maintained in original vials in cold storage for 10 years or more. For these studies, Scatchard analysis was used to explore the binding parameters. In addition, we measured the displacement of 3H-ouabain from DigiFab and Digibind by digoxin in a simple competitive assay.

Animal Studies:

Preliminary (First) Study:

In an initial animal study, we tested the effect of DigiFab in normal, young, healthy Wistar Han IGS rats (~2.5-3 months old; 300-350 gm) infused with low-dose (10 µg/kg/day×28 days) ouabain and subjected to RIR (45 min of bilateral renal clamping). There were 11 rats in the Control group and 15 rats in the DigiFab-treated group. The animals were fed normal rat chow and were on a 12 hr light/12 hr dark cycle. Serum creatinine was used as a measure of relative renal function.

Day 1: Under isoflurane anesthesia 0.5 ml blood was drawn and a subcutaneous Alzet minipump was surgically inserted into the flank to infuse ouabain (10 g/kg/day/rat×28 days).

Day 12: 0.3 ml blood was drawn. At 12 hr before renal clamping and again 6 hr before clamping (Day 13, each rat was injected ip with 0.2 ml of reconstituted 10 mg/ml DigiFab (Treated group) or normal saline (Control group). This dose of DigiFab is sufficient to immunoneutralize 4.8 nmoles of ouabain.

Day 13: Under isoflurane anesthesia 0.3 ml blood was drawn and the rat was injected ip with 0.1 ml of reconstituted DigiFab or saline. Both renal arteries were then occluded for 45 min with a non-traumatic clip; after releasing the clip to permit re-perfusion, the wound was closed.

Blood samples were collected on Days 14, 16 and 26, i.e., 24 hrs, 72 hrs and 13 days post-clamping, respectively. The rats were euthanized after the last blood collection. All blood samples were permitted to clot and were centrifuged and the serum was separated and frozen at −20° C. for later assay. Part of each plasma sample was filtered through a 10K ultrafilter and a portion was extracted over C18 columns for estimation of the free plasma ouabain by radioimmunoassay (RIA). The remaining filtrate was stored at 5° C. until assayed for creatinine. Serum creatinine was measured by absorbance with a Crystal Chem rat enzymatic creatinine assay (kit #80340; Crystal Chem, Elk Grove Village, IL, USA) according to the manufacturer's directions.

From this study, as described in "Results", we learned that:

i. This model was far too severe in terms of the renal ischemia time which resulted in very large, but variable increases in plasma creatinine.

ii. The model did not adequately mimic conditions in patients undergoing CABG who are at high risk for AKI (older, less healthy subjects with modest renal functional impairment and high plasma ouabain levels);

iii. Plasma creatinine, per se, is a rather insensitive measure of renal impairment, and a better marker was needed;

iv. Additional post-operative blood samples were needed to better capture the time-course of renal functional damage and recovery from the ischemia.

These factors were addressed, mostly with success, in the second study.

Second (New) Study:

This study was performed on retired male Wistar Han IGS breeder rats weighing 500-550 gm, ~5-6 months of age; there were 9 rats in the Control group and 12 in the DigiFab-treated group. The animals were fed normal rat chow and were on a 12 hr light/12 hr dark cycle. The rats were uni-nephrectomized (right kidney) and infused with ouabain (30 µg/kg/day×28 days) via a subcutaneous Alzet minipump on Day 1.

The uni-nephrectomy and the faster ouabain infusion were employed to mimic the modest renal functional impairment and the high EO levels in older patients undergoing CABG who are high risk for the development of post-op AKI.

Beginning on Day 12, at 12 hr before left renal artery clamping, and again 6 hr before clamping, each rat was injected ip with 1.2 ml DigiFab (12 mg of antibody, sufficient to neutralize ~28.8 nmoles of ouabain); controls were injected ip with an equal volume of saline. On Day 13, prior to renal clamping, they were injected ip with a third (0.6 ml) dose of DigiFab or saline.

A shorter clamp time (20 min) was used in this study to better mimic the milder ischemia in human subjects and because the uni-nephrectomized rats were much more fragile than the non-nephrectomized rats used in the first study.

Blood samples were collected on Day1 prior to nephrectomy and ouabain infusion, on Day 12 prior to the first DigiFab or saline injection, on Day 13 just before renal clamping, and Days 1, 2, 3, 4, 6 and 12 post-clamping. Creatinine and NGAL (neutrophil gelatinase-associated lipocalin, a sensitive marker of acute renal injury (Dong et al., Frontiers in physiology 10: 153, 2019; McMahon et al., American journal of nephrology 50: 19-28, 2019; Ozlulerden et al., Investigative and clinical urology 58: 289-295, 2017; Rashidi et al., Scientific reports 10: 205, 2020)) were subsequently measured on the plasma samples.

Day 1: Under isoflurane anesthesia 0.5 ml blood was drawn and rats were uni-nephrectomized (right kidney) and a subcutaneous Alzet minipump was surgically inserted into the flank to infuse ouabain (30 µg/kg/day/rat×28 days).

Day 11: Under isoflurane anesthesia a permanent jugular vein catheter was surgically inserted to enable repeated blood withdrawal. The catheter tip was located in the right heart atrium and it exited the skin at the back of the neck.

Day 12: 0.3 ml blood was drawn. At 12 hr before renal clamping and again 6 hr before clamping (Day 13, each rat was injected ip with 1.2 ml of reconstituted 10 mg/ml DigiFab (Treated group) or normal saline (Control group).

Day 13: Under isoflurane anesthesia 0.3 ml blood was drawn and the rat was injected ip with 0.6 ml of reconstituted DigiFab or saline. The left renal artery was then occluded for 20 min with a non-traumatic clip; after releasing the clip, the wound was closed.

Blood samples were collected at 24 hrs, 48 hrs, 72 hrs and 96 hrs, and on Days 6 and 12 post-clamping. All blood samples were collected in EDTA. The rats were euthanized after the last blood collection. Immediately after collection the blood samples were centrifuged and the plasma was separated and frozen at ~20° C. for later assay.

As in the previous study, part of each plasma sample was passed through a 10K centrifugal ultrafilter. The filtrate was stored at 5° C. until assayed for creatinine; the remainder of plasma was re-frozen and stored at −20° C. and was used for the NGAL assay.

Plasma creatinine was assayed on the plasma filtrate by fluorometry with the Sigma-Aldrich enzymatic creatinine assay kit (MAK-080; MilliporeSigma, St. Louis, MO, USA) as modified per consultation with the manufacturer (reduced creatinine probe concentration).

Plasma NGAL was assayed on the plasma with the R&D Systems Rat Lipocalin-/NGAL ELISA kit (DY3508; R&D Systems, Minneapolis, MN, USA) according to the manufacturer's directions. All statistical analyses were performed using SigmaPlot 11 software (Systat Software, Inc., San Jose, CA, USA). Any remaining samples were used directly for ouabain RIA without C18 extraction because the residual sample volumes were too small for reliable extraction. [Note: blood sample collection was limited by NIH standards of care to minimize anemia and maintain the rats in a healthy condition.]

Figure 8:
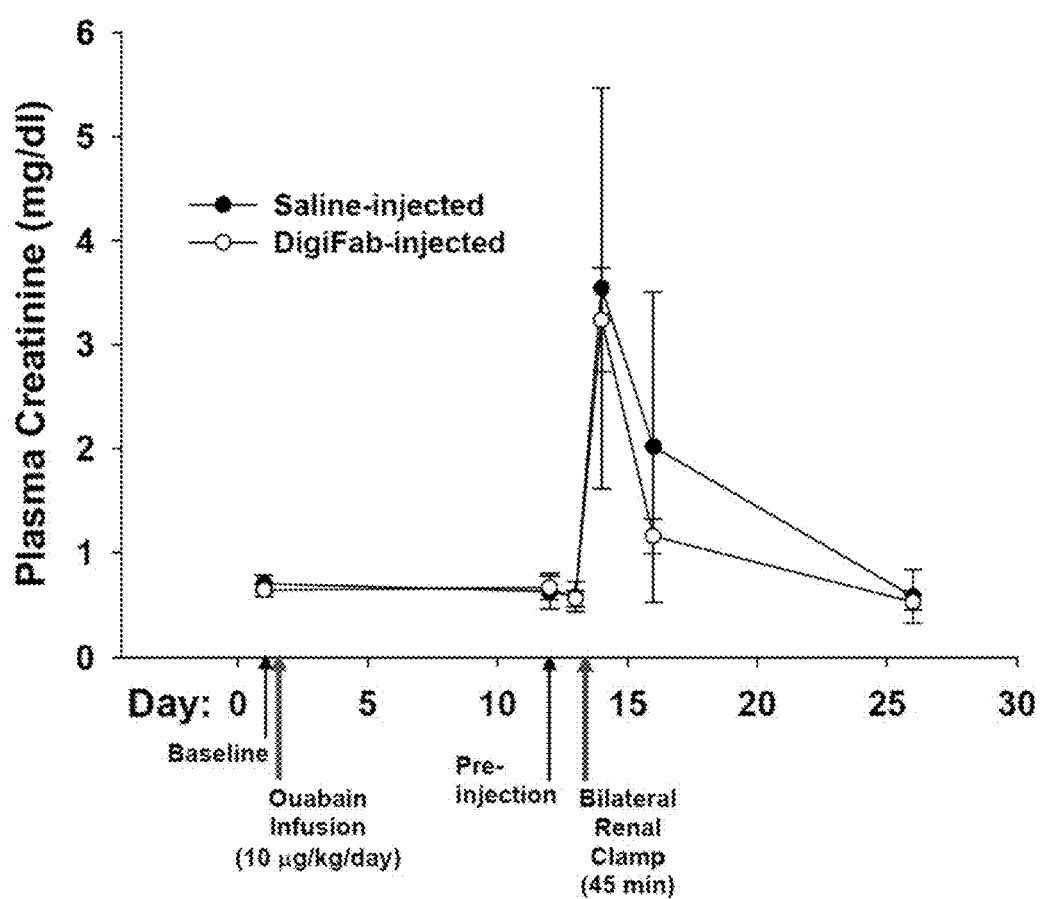
FIG. 8. Effect of DigiFab on the plasma creatinine response to renal ischemia and reperfusion in normal rats infused with a low dose (10 μg ouabain/kg/day) of ouabain. The Control (saline-injected rats; n=11) and DigiFab (n=15) curves are not significantly different (two-way ANOVA). This study was performed on young, health Wistar IGS rats; the rats were not uni-nephrectomized.

Results:

Effects of DigiFab on Plasma/Serum Creatinine Following Renal Ischemia and Reperfusion in Ouabain-Infused Rats In the first experiment we tested the effect of DigiFab on bilateral 45 min renal ischemia-induced changes in plasma creatinine level in normal, healthy young Wistar IGS rats infused with a low dose of ouabain (10 μg ouabain/kg/day); the rats were not uni-nephrectomized. The DigiFab-treated rats in this study exhibited a slightly smaller (~9%) RIR-induced peak rise in creatinine than did the Controls. Intriguingly, the subsequent decline in creatinine was also ~50% faster in the DigiFab-treated rats (FIG. 8 and Table 3). These differences, however, were not statistically significant (two-way ANOVA). There was a large variance in values among the rats in each group, for each condition. The results also indicated that creatinine was not a very sensitive marker for measuring differences in AKI between the control and DigiFab-treated rats despite the ~6-fold peak rise in serum creatinine 24 hr after RIR. Moreover, the young, healthy rats with normal renal function did not mimic the situation in patients undergoing CABG: older individuals with modestly compromised renal function. The second study was therefore undertaken to try to better model the conditions in CABG patients. Also, we decided to take more frequent post-RIR blood samples to better-define the time-course of the recovery of renal function and we included a more sensitive assay of renal function, the NGAL assay.

TABLE 3

(see FIG. 8): Effect of DigiFab pre-injection on plasma creatinine following renal ischemia-reperfusion (RIR) in normal, non-nephrectomized, low dose (10 μg/kg/day) ouabain-infused rats.

| Time of Measurement | Serum Creatinine (mg/dl) Saline-treated rats (n = 11) | Serum Creatinine (mg/dl) DigiFab-treated rats (n = 15) |
|---|---|---|
| Baseline | 0.706 ± 0.086 | 0.645 ± 0.066 |
| Pre-injection | 0.631 ± 0.060 | 0.669 ± 0.113 |
| Pre-clamp | 0.579 ± 0.051 | 0.559 ± 0.075 |
| 24 hr post-RIR | 3.542 ± 0.581 | 3.237 ± 0.489 |
| 72 hr post-RIR | 2.019 ± 0.449 | 1.161 ± 0.170 |
| 12 day post RIR | 0.586 ± 0.081 | 0.531 ± 0.079 |

Figure 9:
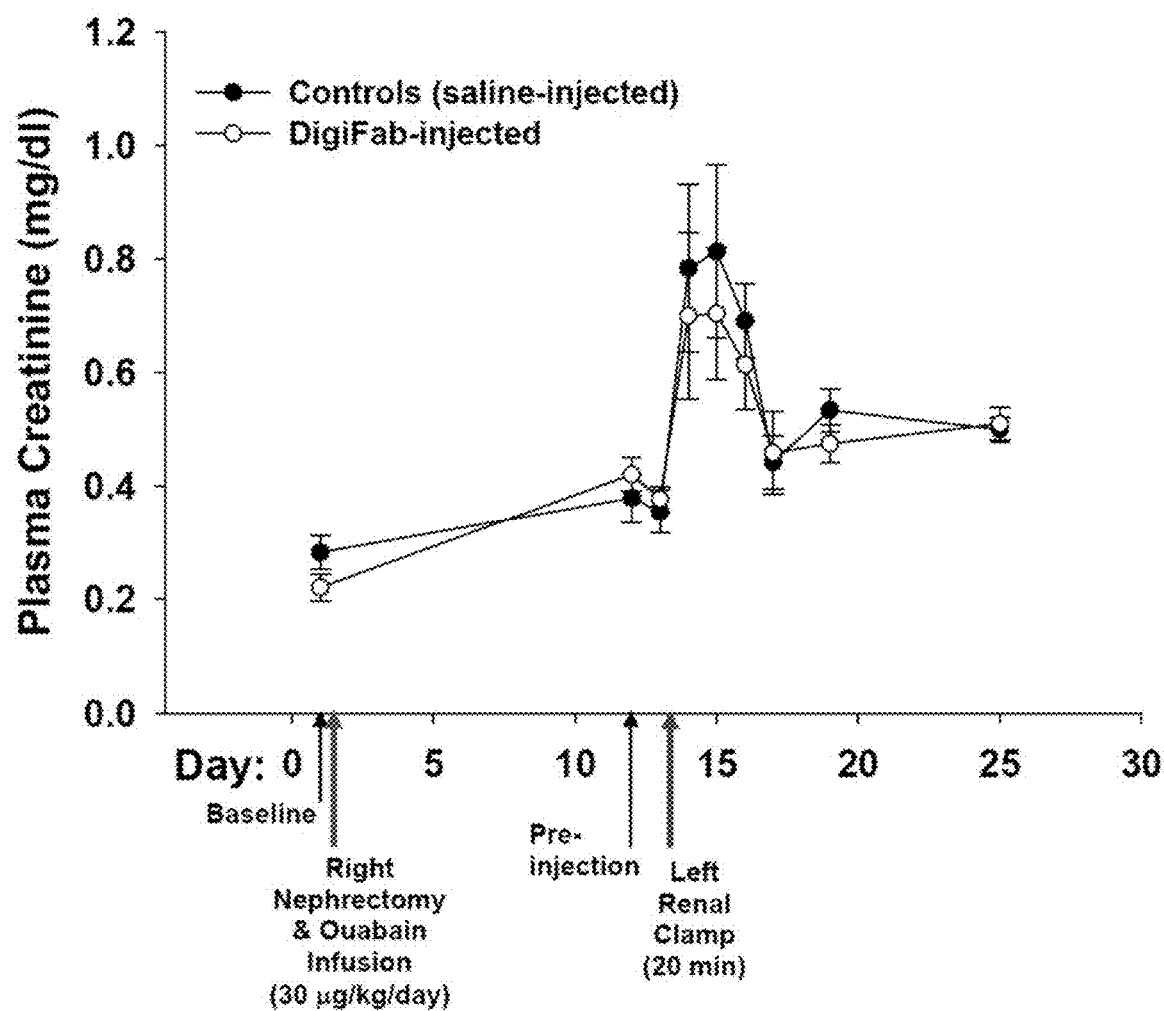
FIG. 9. Effect of DigiFab on the plasma creatinine response to renal ischemia and reperfusion. The Control and DigiFab curves are not significantly different (two-way ANOVA).

In the second study we used older rats (retired breeders), that were uni-nephrectomized to model modest renal functional impairment, and we infused a higher concentration of ouabain (30 rather than 10 μg/kg/day). The duration of renal ischemia was also reduced to 20 min (vs 45 min in the first study) because these rats already had reduced renal function. In this study, plasma creatinine increased about 20% more in control rats than in DigiFab-treated rats following the brief RIR (Table 4 and FIG. 9). This result also was not statistically significant (two-way ANOVA), however.

In contrast to the first study, the maximum RIR-induced increase in creatinine was only ~2-fold (Table 4) as anticipated, but there was still a large variance in the creatinine response among the rats. Nevertheless, when taken together, the data in the two studies both suggest that DigiFab may attenuate the AKI-induced renal impairment as determined by the creatinine assay.

TABLE 4

(see FIG. 9): Effect of DigiFab pre-injection on plasma creatinine following renal ischemia-reperfusion (RIR) in uni-nephrectomized, ouabain-infused rats.

| Time of Measurement | Plasma Creatinine (mg/dl) Saline-treated rats (n = 9) | Plasma Creatinine (mg/dl) DigiFab-treated rats (n = 12) |
|---|---|---|
| Baseline | 0.283 ± 0.030 | 0.221 ± 0.023 |
| Pre-injection | 0.379 ± 0.043 | 0.421 ± 0.030 |
| Pre-clamp | 0.355 ± 0.038 | 0.337 ± 0.022 |
| 24 hr post-RIR | 0.784 ± 0.148 | 0.700 ± 0.147 |
| 48 hr post-RIR | 0.813 ± 0.152 | 0.704 ± 0.116 |
| 72 hr post-RIR | 0.691 ± 0.066 | 0.614 ± 0.078 |
| 96 hr post-RIR | 0.442 ± 0.046 | 0.459 ± 0.074 |
| 6 day post-RIR | 0.534 ± 0.037 | 0.475 ± 0.033 |
| 12 day post RIR | 0.500 ± 0.022 | 0.510 ± 0.029 |

Figure 10:
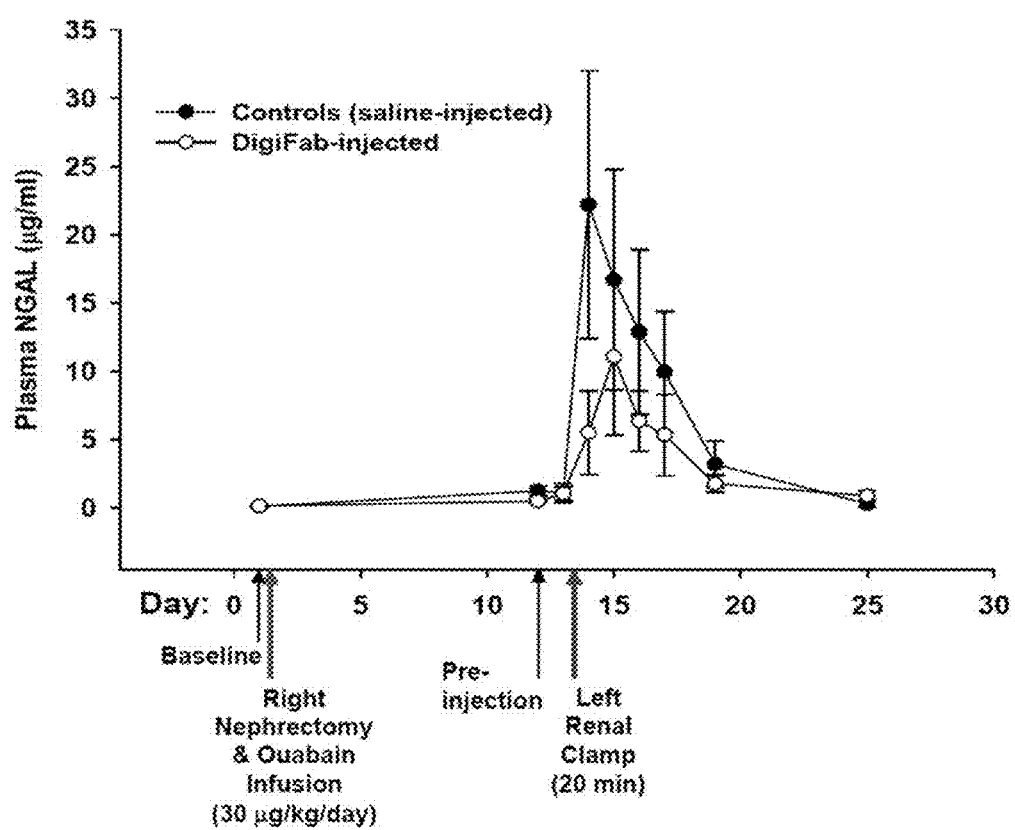
FIG. 10. Effect of DigiFab on the plasma NGAL response to renal ischemia and reperfusion. The Control and DigiFab curves are significantly different (P=0.027; two-way ANOVA).

Effects of DigiFab on Plasma NGAL Following Renal Ischemia and Reperfusion in Ouabain-Infused Rats Plasma NGAL (neutrophil gelatinase-associated lipocalin) is a small protein produced and secreted by kidney tubules cells that circulates at very low levels under normal conditions. Its presence at elevated levels in plasma is an early and sensitive indicator of AKI (Dong et al., Frontiers in physiology 10: 153, 2019; Erkilic et al., Drug design, development and therapy 11: 677-683, 2017; McMahon et al., American journal of nephrology 50: 19-28, 2019; Ozlulerden et al., Investigative and clinical urology 58: 289-295, 2017; Rashidi et al., Scientific reports 10: 205, 2020). Therefore, as described in *Protocol and Methods*, we tested whether NGAL is elevated in our renal ischemia model, and whether DigiFab can attenuate this elevation. The results are shown in Table 5 and FIG. 10. In contrast to creatinine, which rose ~2-to-6-fold following RIR (Tables 5 and 4), NGAL rose ~200-fold (Table 5). Further, the data indicate that pre-treatment with DigiFab both delayed and significantly attenuated the rise in plasma NGAL following the renal ischemia. The difference between the two curves in FIG. 10 is statistically significant (P=0.027; two-way ANOVA).

The clear implication is that circulating endogenous ouabain (or some other endogenous cardiotonic steroid that interacts with DigiFab) plays a role in ischemia-induced AKI, and that immunoneutralization of ouabain/EO can attenuate the post-ischemic AKI. Due to aforementioned interference in the ouabain RIA we were unable to document the expected sequestration of ouabain by DigiFab. This endpoint would have been helpful to demonstrate the mechanism of the cause-effect and may have to be addressed at a later date. Finally, these results and this interpretation are entirely consistent with the report that rostafuroxin, an ouabain antagonist, attenuated ischemia-induced renal injury in a somewhat similar rat model (Villa et al., International journal of molecular sciences 17: 2016).

TABLE 5

(see FIG. 10): Effect of DigiFab pre-injection on plasma NGAL following renal ischemia-reperfusion (RIR) in uni-nephrectomized, ouabain-infused rats (same animals as in Table 4).

| Time of Measurement | Plasma NGAL (μg/ml) Saline-treated rats (n = 9) | Plasma NGAL (μg/ml) DigiFab-treated rats (n = 12) |
|---|---|---|
| Baseline | 0.11 ± 0.02 | 0.16 ± 0.06 |
| Pre-injection | 1.25 ± 0.36 | 0.49 ± 0.12 |
| Pre-clamp | 1.10 ± 0.72 | 1.05 ± 0.51 |
| 24 hr post-RIR | 22.19 ± 9.79 | 5.49 ± 3.06 |
| 48 hr post-RIR | 16.69 ± 8.08 | 11.07 ± 5.72 |
| 72 hr post-RIR | 12.86 ± 6.04 | 6.34 ± 2.20 |
| 96 hr post-RIR | 9.94 ± 4.44 | 5.33 ± 2.97 |
| 6 day post-RIR | 3.19 ± 1.69 | 1.77 ± 0.61 |
| 12 day post RIR | 0.30 ± 0.28 | 0.89 ± 0.38 |

CONCLUSION

Using plasma NGAL to detect renal damage, we found that pre-ischemic administration of DigiFab significantly attenuated the rise of NGAL (and, thus, acute renal injury, AKI) in uni-nephrectomized rats infused with ouabain and subjected to a 20 minute period of renal ischemia. Although the RIR-induced rise of plasma creatinine was also modestly attenuated by DigiFab, this effect was not statistically significant—likely because the relative rise in plasma creatinine was much smaller than the rise in plasma NGAL.

Based on these results in experimental animals, we anticipate that DigiFab is likely to be useful for attenuating/preventing AKI in patients undergoing major surgeries such as CABG and in other patients who are at high risk for the development of post-operative AKI.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Throughout this disclosure, various publications, patents and published patent specifications are referenced by an identifying citation. The disclosures of these publications, patents and published patent specifications are hereby incorporated by reference into the present disclosure to more fully describe the state of the art to which this invention pertains.

We claim:

1. A method of preventing, reducing or attenuating acute kidney injury in a subject at risk of experiencing a transient increase in kidney ischemia or hypoxia, comprising administering to the subject a composition comprising an effective amount of an agent that binds to and neutralizes endogenous ouabain (EO), wherein the subject at risk of experiencing a transient increase in kidney ischemia or hypoxia has sepsis or is undergoing surgery, wherein the subject is administered the composition prior to surgery, during surgery and/or after surgery, wherein the agent is an ouabain-binding antibody fragment, or mixture of Fab, Fab' or F(ab')2 fragments, wherein the agent is administered at a dose at each administration of from about 20 mg to about 160 mg, wherein the composition further comprises a protease inhibitor.

2. The method of claim 1, wherein the agent prevents the binding of endogenous ouabain to a $Na^+/K^+$ ATPase ($Na^+$ pump).

3. The method of claim 1, wherein the agent is an ouabain-binding antibody fragment.

4. The method of claim 1, wherein the subject is administered at least one treating dose of ouabain binding antibody fragments prior to surgery.

5. The method of claim 1, wherein the administration of the agent that binds to endogenous ouabain is sufficient to reduce the level of endogenous free ouabain in the subject.

6. The method of claim 1, wherein the agent comprises a mixture of polyclonal antibody fragments.

7. The method of claim 1, wherein the antibody fragment comprises Fab, Fab' or F(ab')2 fragments.

8. The method of claim 1, wherein the agent comprises a polyclonal mixture of digoxin immune Fab, Fab' and/or F(ab')2 fragments.

9. The method of claim 1, wherein the agent is administered about 6 to about 36 hours before surgery.

10. The method of claim 1, wherein the agent is an antibody fragment or mixture of Fab, Fab' or F(ab')2 fragments, wherein the agent is administered two times, wherein the total of the doses administered is about 40 mg to about 320 mg for a two administration regimen.

11. The method of claim 1, wherein the agent is an antibody fragment or mixture of Fab, Fab' or F(ab')2 fragments, wherein the agent is administered three times, wherein the total of the doses administered is about 60 mg to about 480 mg for a three administration regimen.

12. The method of claim 1, wherein the subject at risk includes a subject undergoing a surgery selected from the group consisting of cardiopulmonary bypass surgery (CBP), coronary artery bypass graft (CABG) surgery, laparotomy, thoracotomy, orthopaedic and bariatric surgery, and the use of contrast agents.

13. The method of claim 1, wherein the agent is administered at a dose sufficient to remove at least about 90% of circulating free ouabain in the subject's plasma.

14. The method of claim 1, wherein the subject is a patient with a kidney glomerular filtration rate (GFR) of <60 ml/min.

15. The method of claim 1, wherein the subject has a plasma endogenous ouabain level of 133 pM or higher.

16. The method of claim 1, wherein the protease inhibitor is E-64 ((1S,2S)-2-(((S)-1-((4-guanidinobutyl)amino)-4-methyl-1-oxopentan-2-yl) carbamoyl)cyclopropanecarboxylic acid).

* * * * *